(12) United States Patent
Ogasawara et al.

(10) Patent No.: US 8,654,364 B2
(45) Date of Patent: Feb. 18, 2014

(54) DOCUMENT FEEDING DEVICE AND IMAGE FORMING APPARATUS IN WHICH EVEN SMALL-SIZED DOCUMENTS CAN BE PROPERLY TRANSPORTED

(75) Inventors: Hironori Ogasawara, Osaka (JP); Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 107 days.

(21) Appl. No.: 13/468,847

(22) Filed: May 10, 2012

(65) Prior Publication Data

US 2012/0300236 A1    Nov. 29, 2012

(30) Foreign Application Priority Data

May 23, 2011 (JP) ................................. 2011-114928

(51) Int. Cl.
*G06F 3/12* (2006.01)
*H04N 1/04* (2006.01)

(52) U.S. Cl.
USPC ........................................ 358/1.13; 358/498

(58) Field of Classification Search
USPC .............. 358/1.1, 1.12, 1.13, 1.14, 1.15, 488, 358/496, 498; 347/153, 215; 355/407, 388
See application file for complete search history.

(56) References Cited

U.S. PATENT DOCUMENTS

| | | | |
|---|---|---|---|
| 5,903,811 A | 5/1999 | Kobayashi et al. | |
| 6,047,959 A | 4/2000 | Baba et al. | |
| 7,355,761 B2 * | 4/2008 | Yang | 358/498 |
| 8,104,765 B2 * | 1/2012 | Tsuchiya et al. | 271/270 |
| 2006/0023269 A1 * | 2/2006 | Tsuchiya et al. | 358/498 |
| 2007/0188794 A1 * | 8/2007 | Matsui et al. | 358/1.15 |
| 2012/0170087 A1 * | 7/2012 | Nose et al. | 358/498 |

FOREIGN PATENT DOCUMENTS

| | | |
|---|---|---|
| JP | 8-133551 A | 5/1996 |
| JP | 11-30882 A | 2/1999 |
| JP | 2011-42485 A | 3/2011 |

* cited by examiner

*Primary Examiner* — Gabriel Garcia
(74) *Attorney, Agent, or Firm* — Birch, Stewart, Kolasch & Birch, LLP

(57) ABSTRACT

A document feeding device of the present invention includes: a discharge roller pair that includes a first drive roller and a first idler roller; and a transport roller pair that includes a second drive roller and a second idler roller. Either one of the second drive roller and the second idler roller moves between a contact position where said roller is in contact with the other roller and a separation position where said roller is separated from the other roller. The transport roller pair is disposed on the other side of the discharge roller pair from a discharge tray. The transport roller pair transports a document that has passed through the reading position to the discharge roller pair by positioning said roller at the contact position in a case where the first drive roller rotates forward.

11 Claims, 28 Drawing Sheets

DOCUMENT FEEDING DEVICE AND IMAGE FORMING APPARATUS IN WHICH EVEN SMALL-SIZED DOCUMENTS CAN BE PROPERLY TRANSPORTED

CROSS-REFERENCE TO RELATED APPLICATION

This application claims priority under 35 U.S.C. §119 (a) on patent application No. 2011-114928 filed in Japan on May 23, 2011, the entire contents of which are herein incorporated by reference.

FIELD OF THE INVENTION

The present invention relates to a document feeding device provided with a discharge roller pair, and to an image forming apparatus.

RELATED ART

Conventionally, for example, a document feeding device provided with a discharge roller pair that rotates forward and in reverse as disclosed in JP H8-133551A (hereinafter, referred to as "Patent Document 1") is known.

Patent Document 1 discloses an automatic document feeding device provided with a transport path that transports a document to a reading position, a switchback path that returns the document that has passed through the reading position to the upstream side of the reading position, and a discharge roller pair that rotates forward and in reverse.

The automatic document feeding device in Patent Document 1 transports a document via the transport path to the reading position, enabling an image reading device to read the document. In the automatic document feeding device, when the discharge roller pair rotates forward, the document that has passed through the reading position is discharged to a paper discharge tray, and when the discharge roller pair rotates in reverse, the document that has passed through the reading position is switched back.

Here, the automatic document feeding device is configured such that, in the case where the document size is large, a leading edge and a trailing edge of a document temporarily overlap each other at the position of the discharge roller pair (between the rollers of the discharge roller pair) at the time of switching back. Accordingly, the size of the automatic document feeding device is reduced.

The automatic document feeding device in Patent Document 1 further includes a DC solenoid for separating the rollers of the discharge roller pair from each other when a leading edge and a trailing edge of a document overlap each other. Accordingly, the automatic document feeding device can smoothly transport a document without causing a large amount of friction between the leading edge and the trailing edge of the document.

However, the conventional automatic document feeding device disclosed in Patent Document 1 is problematic in that a DC solenoid for separating the rollers of the discharge roller pair from each other has to be provided.

Thus, a configuration is conceivable in which the distance between the path that circulates a document at the time of switching back and the discharge roller pair is increased such that a leading edge and a trailing edge of a document do not overlap each other at the position of the discharge roller pair at the time of switching back even in the case where the document size is large.

However, the configuration in which the distance between the path that circulates a document at the time of switching back and the discharge roller pair is increased is problematic in that, since the transport distance to the discharge roller pair is increased, it is difficult to transport small-sized documents such as business cards.

The present invention was achieved in order to solve the above-described problems, and it is an object thereof to provide a document feeding device and an image forming apparatus in which even small-sized documents can be properly transported in the case where the transport distance to a discharge roller pair is long.

SUMMARY OF THE INVENTION

The present invention is directed to a document feeding device that includes: a first transport path on which a document is transported to a reading position; a second transport path on which the document that has been transported to the reading position is transported to a discharge tray; a third transport path that is disposed between the first transport path and the second transport path and on which the document that has passed through the reading position is returned to the first transport path; and a discharge roller pair that is disposed on the second transport path and that includes a first drive roller and a first idler roller, the discharge roller pair transporting the document that has passed through the reading position to the discharge tray by rotating the first drive roller forward, and transporting the document that has passed through the reading position via the third transport path to the first transport path by rotating the first drive roller in reverse; wherein the document feeding device includes a transport roller pair that is disposed on the second transport path and that includes a second drive roller and a second idler roller, either one of the second drive roller and the second idler roller moves between a contact position where said roller is in contact with the other roller and a separation position where said roller is separated from the other roller, and the transport roller pair is disposed on the other side of the discharge roller pair from the discharge tray, and transports the document that has passed through the reading position to the discharge roller pair by positioning said roller at the contact position in a case where the first drive roller rotates forward.

With this configuration, it is possible for small-sized documents such as business cards to be transported by the transport roller pair to the discharge roller pair, even in the case where the transport distance to the discharge roller pair is long because the discharge roller pair is disposed on the side of the discharge tray with respect to the position where two ends of a document overlap each other at the time of switching back. Furthermore, it is not necessary to provide a constituent element such as an actuator for separating the rollers of the discharge roller pair from each other, and, thus, the transport mechanism for a document can be suppressed from being complicated. As a result, the need for providing an actuator or the like has been eliminated in order to suppress the transport mechanism from being complicated, and even small-sized documents can be properly transported in the case where the transport distance to the discharge roller pair is long.

In the document feeding device according to the present invention, it is preferable that the roller of the transport roller pair moves from the contact position to the separation position in a case where the first drive roller rotates in reverse.

With this configuration, it is possible to withdraw the roller of the transport roller pair from the second transport path when the discharge roller pair transports a document via the third transport path to the first transport path. Accordingly, the transport roller pair can be prevented from disturbing the transport of the document that is being switched back.

In the document feeding device according to the present invention, said roller may be the second drive roller, and the other roller may be the second idler roller.

With this configuration, it is possible to move the second drive roller between the contact position and the separation position.

In the document feeding device according to the present invention, it is preferable that the document feeding device further includes a transmitting member that transmits a driving force of the first drive roller to the second drive roller.

With this configuration, it is possible to easily rotate the second drive roller of the transport roller pair forward in the case where the first drive roller of the discharge roller pair rotates forward.

In the document feeding device according to the present invention, the document feeding device may further include: a holding member that holds the second drive roller; and a load member that applies a load to rotation of the second drive roller; wherein the second drive roller held by the holding member may move between the contact position and the separation position in a case where the transmitting member transmits a driving force of the first drive roller to the second drive roller and the second drive roller does not rotate due to a load applied by the load member.

With this configuration, it is possible to move the second drive roller of the transport roller pair between the contact position and the separation position without additionally providing a driving source such as an actuator.

In the document feeding device according to the present invention, it is preferable that the second drive roller is formed in a shape of a cylinder, and the load member is disposed inside the second drive roller in the shape of a cylinder.

With this configuration, it is possible to suppress the size of the document feeding device from being increased by arranging the load member.

In the document feeding device according to the present invention, it is preferable that the load member is a compression coil spring, and the compression coil spring biases the second drive roller toward the holding member.

With this configuration, it is possible to easily apply a load to the rotation of the second drive roller of the transport roller pair.

In the document feeding device according to the present invention, the transmitting member may be a belt that is stretched between the first drive roller and the second drive roller.

With this configuration, it is possible to easily transmit the driving force of the first drive roller of the discharge roller pair to the second drive roller of the transport roller pair.

In the document feeding device according to the present invention, the first drive roller of the discharge roller pair may rotate forward when a leading edge of a document transported on the second transport path reaches a position between the rollers of the transport roller pair, and, in a case where the first drive roller rotates forward, the second drive roller of the transport roller pair may move from the separation position to the contact position and then rotate forward.

With this configuration, it is possible for a document that is being transported on the second transport path to be transported by the transport roller pair to the discharge roller pair.

In the document feeding device according to the present invention, the forward-rotating first drive roller of the discharge roller pair may rotate in reverse when a trailing edge of a document transported on the second transport path passes through a linking point between the second transport path and the third transport path, and, in a case where the first drive roller rotates in reverse, the second drive roller of the transport roller pair may move from the contact position to the separation position.

With this configuration, it is possible to easily withdraw the second drive roller of the transport roller pair from the second transport path when the discharge roller pair transports a document via the third transport path to the first transport path.

Also, the present invention is directed to an image forming apparatus, including the document feeding device according to any one of the above-described aspects; an image reading unit that reads a document transported by the document feeding device; and an image forming unit that forms an image based on image data read by the image reading unit.

With this configuration, it is possible to obtain an image forming apparatus including a document feeding device that can properly transport even small-sized documents.

DESCRIPTION OF THE PREFERRED EMBODIMENT

Hereinafter, an embodiment of the present invention will be described with reference to the drawings.

Figure 1:
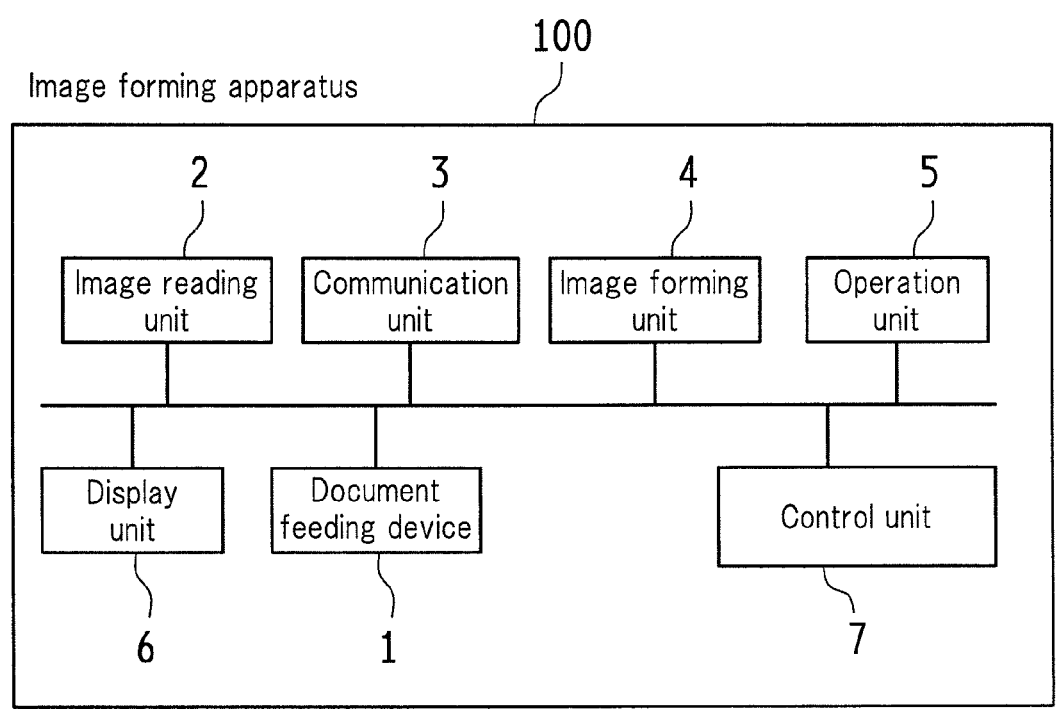
FIG. 1 is a block diagram showing the configuration of an image forming apparatus according to an embodiment of the present invention.

FIG. 1 is a block diagram showing the configuration of an image forming apparatus according to an embodiment of the present invention. Hereinafter, the configuration of an image forming apparatus 100 according to this embodiment will be described with reference to FIG. 1.

The image forming apparatus 100 is a multifunction peripheral having a scanner function, a facsimile function, a printer function, and the like. Specifically, the image forming apparatus 100 is provided with a document feeding device 1, an image reading unit 2, a communication unit 3, an image forming unit 4, an operation unit 5, a display unit 6, and a control unit 7.

Figure 2:
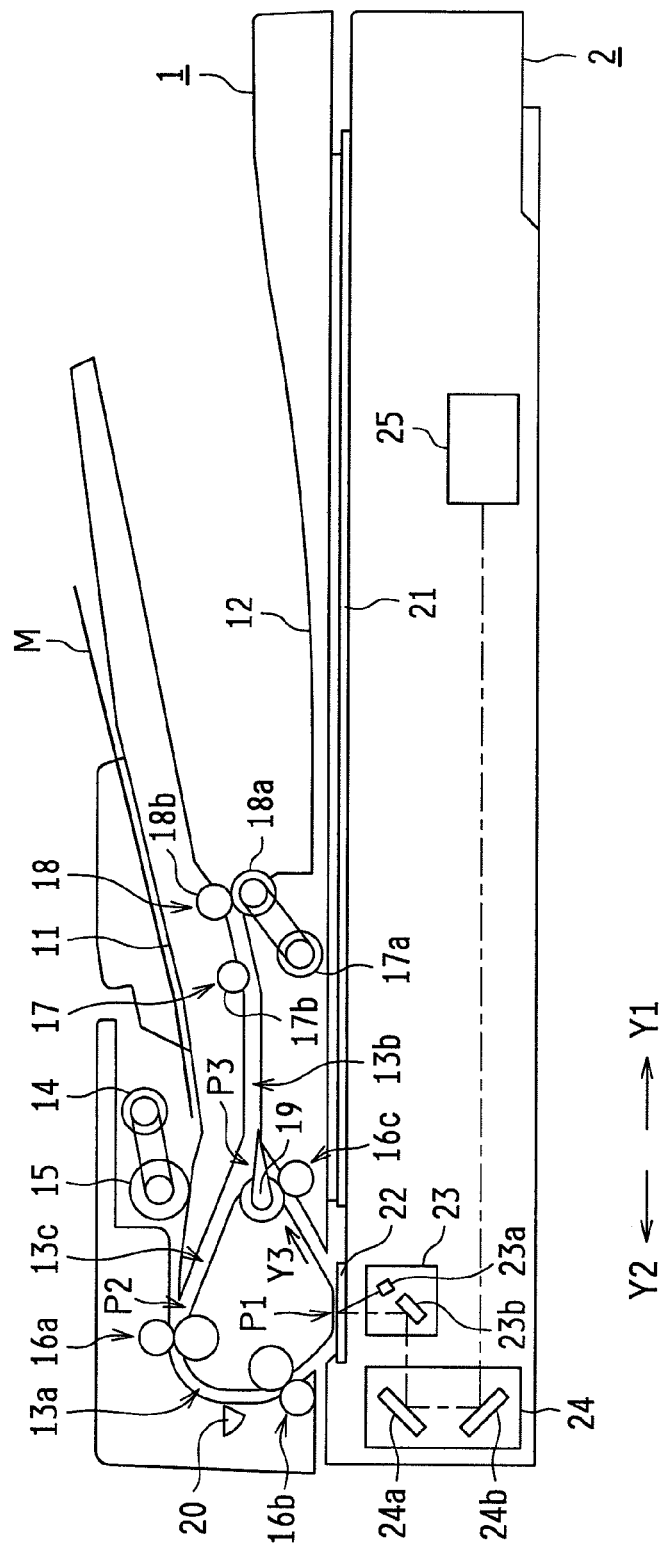
FIG. 2 is a front view showing the outline of a document feeding device and an image reading unit of the image forming apparatus shown in FIG. 1.

The document feeding device 1 is disposed in order to feed a document M (see FIG. 2) to a reading position P1 for the image reading unit 2 (see FIG. 2). The document feeding device 1 is configured so as to be capable of feeding a plurality of preset types (sizes) of documents M. The document feeding device 1 will be described later in detail. The image reading unit 2 is, for example, a scanner, and has a function of reading an image from a document such as the document M transported by the document feeding device 1.

The communication unit 3 is disposed in order to exchange facsimile data. The image forming unit 4 has a function of forming an image based on image data read by the image reading unit 2 or facsimile data received by the communication unit 3. The operation unit 5 includes a power switch and the like, and is disposed in order to allow a user to input various operational commands.

The display unit 6 is, for example, a liquid crystal display, and is configured so as to display the operation state of the image forming apparatus 100 and the like. The control unit 7 includes a central processing unit (CPU), a read only memory (ROM), a random access memory (RAM), and the like, and is disposed in order to control the operation of the image forming apparatus 100.

FIG. 2 is a front view showing the outline of the document feeding device and the image reading unit of the image forming apparatus shown in FIG. 1. Hereinafter, the document feeding device 1 and the image reading unit 2 of the image forming apparatus 100 according to this embodiment will be described with reference to FIG. 2.

The document feeding device 1 is attached in an openable and closable manner to the image reading unit 2. The document feeding device 1 includes a document tray 11 on which the document M is placed, a discharge tray 12 to which the document M is discharged, a transport path 13a on which the document M that has been placed on the document tray 11 is transported to the reading position P1, a transport path 13b on which the document M that has been transported to the reading position P1 is transported to the discharge tray 12, and a transport path 13c on which the document M that has passed through the reading position P1 is returned to the transport path 13a.

Here, in this embodiment, the transport path 13a corresponds to a "first transport path" of the present invention, the transport path 13b corresponds to a "second transport path" of the present invention, and the transport path 13c corresponds to a "third transport path" of the present invention.

On the document tray 11, the document M is placed face up. The document tray 11 is disposed on the side of one direction Y1 with respect to the reading position P1. Here, the reading position P1 is a position that is illuminated with a light source 23a via a document reading glass 22. A pickup roller 14 is disposed near the document tray 11. The pickup roller 14 is disposed in order to introduce documents M that have been placed on the document tray 11 sequentially from the top into the document feeding device 1.

A separation roller 15 is disposed near the pickup roller 14. The separation roller 15 is disposed in order to prevent transportation of a plurality of overlapping documents M to the transport path 13a (multi-feeding).

The discharge tray 12 is disposed below the document tray 11, and the document M is discharged face down to the discharge tray 12. Furthermore, the discharge tray 12 is disposed on the side of said direction Y1 with respect to the reading position P1. That is to say, the discharge tray 12 and the document tray 11 are arranged on the same side in the sub-scanning direction Y1 with respect to the reading position P1.

The path from the document tray 11 to the discharge tray 12 configured by the transport path 13a and the transport path 13b is in the shape of a U when viewed from the front. Specifically, the transport path 13a is formed so as to be extended from said direction Y1 side of the reading position P1 to another direction Y2 side, and then from the other direction Y2 side of the reading position P1 to the reading position P1. That is to say, the transport path 13a is formed so as to be extended above the reading position P1 and then folded back toward the reading position P1.

The transport path 13b is formed so as to be extended from the reading position P1 to said direction Y1 side. The transport path 13c is disposed between the transport path 13a and the transport path 13b. Furthermore, the transport path 13c is a path from a linking point P2 with the transport path 13a to a linking point P3 with the transport path 13b. Accordingly, part of the transport path 13a, part of the transport path 13b, and the transport path 13c form a circulation path. Specifically, this circulation path is configured by the transport path 13a between the linking point P2 and the reading position P1, the transport path 13b between the reading position P1 and the linking point P3, and the transport path 13c. Here, the transport path 13b between the linking point P3 and the discharge tray 12 functions as a switchback path for switching a leading edge and a trailing edge of the document M with respect to the transport direction.

The transport path 13a is provided with a transport roller pair 16a and a transport roller pair 16b, and the transport path 13b is provided with a transport roller pair 16c, a transport roller pair 17, and a discharge roller pair 18.

The transport roller pair 16a is disposed near the linking point P2 on the downstream side of the linking point P2. The transport roller pair 16b is disposed near the reading position P1 on the upstream side of the reading position P1. The transport roller pair 16c is disposed between the reading position P1 and the linking point P3. The transport roller pair 17 and the discharge roller pair 18 are arranged between the linking point P3 and the discharge tray 12. That is to say, the transport roller pair 16a, the transport roller pair 16b, and the transport roller pair 16c are arranged on the circulation path, and the transport roller pair 17 and the discharge roller pair 18 are arranged on the switchback path.

Furthermore, the transport roller pair 17 is disposed on the other side of the discharge roller pair 18 from the discharge tray 12. The discharge roller pair 18 is disposed adjacent to the discharge tray 12. Accordingly, on the switchback path, the discharge roller pair 18 and the transport roller pair 17 are arranged in this order from the discharge tray 12 side.

The transport roller pair 17 has a drive roller 17a and an idler roller 17b. The discharge roller pair 18 has a drive roller 18a and an idler roller 18b. Here, in this embodiment, the drive roller 17a corresponds to a "second drive roller" and "one roller" of the present invention, and the idler roller 17b corresponds to a "second idler roller" and "the other roller" of the present invention. Furthermore, in this embodiment, the drive roller 18a corresponds to a "first drive roller" of the present invention, and the idler roller 18b corresponds to a "first idler roller" of the present invention. The drive roller 17a of the transport roller pair 17 and the drive roller 18a of the discharge roller pair 18 will be described later in detail.

A claw member 19 is disposed in a movable manner near the linking point P3. The claw member 19 is disposed at a position where it blocks the transport path 13b due to its own weight. Furthermore, the claw member 19 is configured so as to open the transport path 13b by being pushed up by the document M when the document M is being transported in a transport direction Y3.

Furthermore, a sensor 20 is disposed near the transport roller pair 16b on the upstream side of the transport roller pair 16b. The sensor 20 is, for example, a photointerrupter, and has a function of detecting movement of a rotatably arranged lever (not shown). This lever is disposed at a position where it blocks the transport path 13a, and is configured so as to be pushed by the document M out of the transport path 13a when the document M is being transported on the transport path 13a. The sensor 20 is disposed in order to enable a control unit 33 (see FIG. 3) to determine whether or not the document M is positioned near the transport roller pair 16b on the upstream side of the transport roller pair 16b.

The image reading unit 2 is configured so as to be capable of reading an image in the document fixed mode and in the document moving mode. The image reading unit 2 has a flatbed glass 21, the document reading glass 22, a light source unit 23, a mirror unit 24, and an imaging unit 25.

The flatbed glass 21 is a transparent glass plate having a size larger than the maximum size of the document M. The document reading glass 22 is a transparent glass plate extended in the main-scanning direction (direction perpendicular to the section of the diagram of FIG. 2). The flatbed glass 21 and the document reading glass 22 are configured so as to pass light emitted from the light source unit 23 and light reflected by the document M.

The light source unit 23 has the light source 23a that illuminates the document M with light and a mirror 23b that guides light reflected by the document M to the mirror unit 24. The light source unit 23 is configured so as to be capable of moving in the sub-scanning direction Y1. The light source 23a is configured by a plurality of light-emitting diodes (LEDs) arranged at intervals in the main-scanning direction.

The mirror unit 24 has a mirror 24a and a mirror 24b. The mirror unit 24 is configured so as to be capable of moving in the sub-scanning direction Y1 at a moving speed that is ½ the moving speed of the light source unit 23. The mirror 24a is disposed in order to guide light reflected by the mirror 23b of the light source unit 23 to the mirror 24b. The mirror 24b is disposed in order to guide light reflected by the mirror 24a to the imaging unit 25.

The imaging unit 25 has a condensing lens, a charge coupled device (CCD), and the like. The imaging unit 25 is configured so as to capture an image of the document M by forming an image of light reflected by the mirror 24b of the mirror unit 24 via the condensing lens on a light receiving face of the CCD.

In the image reading unit 2, in image reading in the document fixed mode, light is emitted from the light source 23a while the light source unit 23 and the mirror unit 24 are moved in the sub-scanning direction Y1. At that time, the light emitted from the light source 23a travels via the flatbed glass 21 and illuminates the document M placed on the flatbed glass 21. Then, the light reflected by the document M travels via the flatbed glass 21, the mirror 23b of the light source unit 23, and the mirror 24a and the mirror 24b of the mirror unit 24, and is incident on the imaging unit 25. Accordingly, the image reading unit 2 can read an image of the document M disposed in a fixed manner on the flatbed glass 21.

Furthermore, in the image reading unit 2, in image reading in the document moving mode, light is emitted from the light source 23a while the light source unit 23 has been stopped at the reading position (position shown in FIG. 2). At that time, the light emitted from the light source 23a travels via the document reading glass 22 and illuminates the document M transported in the transport direction Y1 on the document reading glass 22 by the document feeding device 1. Then, the light reflected by the document M travels via the document reading glass 22, the mirror 23b of the light source unit 23, and the mirror 24a and the mirror 24b of the mirror unit 24, and is incident on the imaging unit 25. Accordingly, the image reading unit 2 can read an image of the document M transported on the document reading glass 22 by the document feeding device 1.

Figure 3:
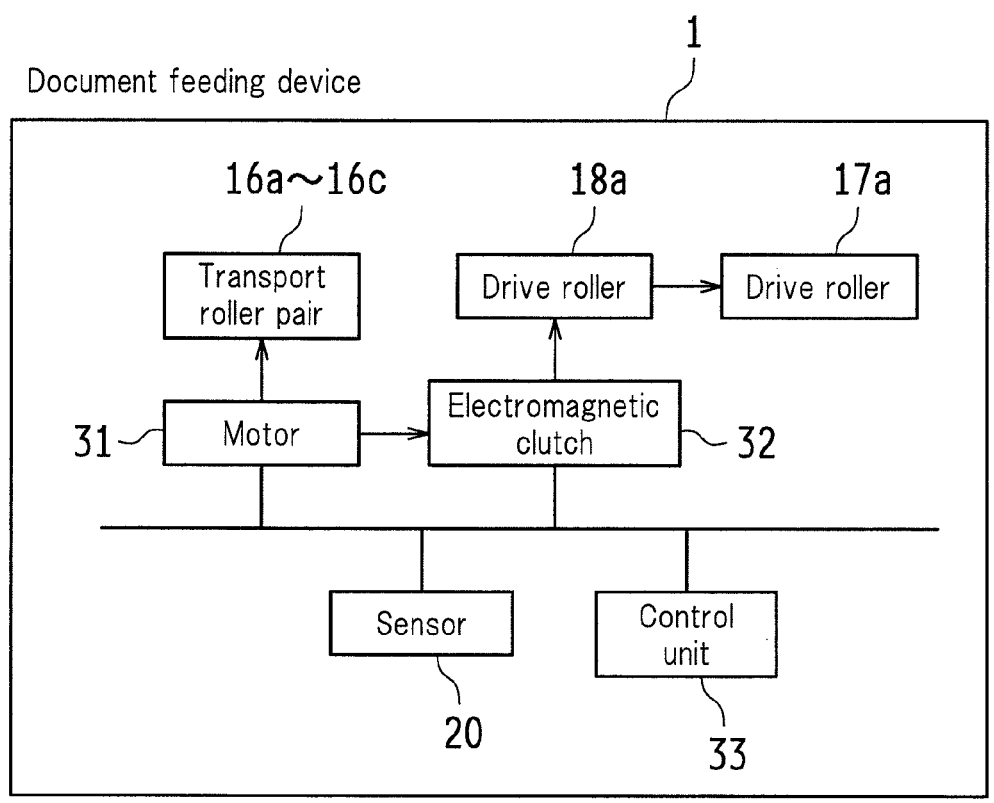
FIG. 3 is a block diagram showing the electrical configuration of the document feeding device shown in FIG. 2.

FIG. 3 is a block diagram showing the electrical configuration of the document feeding device shown in FIG. 2. Hereinafter, the electrical configuration of the document feeding device 1 according to this embodiment will be described with reference to FIG. 3.

The document feeding device 1 is provided with a motor 31 that rotates forward and in reverse. The driving force of the motor 31 is transmitted via a gear (not shown) and the like to the transport roller pairs 16a to 16c.

Specifically, the transport roller pair 16a is configured so as to rotate forward when the motor 31 rotates forward, and rotate forward also when the motor 31 rotates in reverse. That is to say, the transport roller pair 16a is configured so as to transport the document M held by the transport roller pair 16a toward the reading position P1 when the motor 31 rotates forward and in reverse.

Meanwhile, the transport roller pair 16b and the transport roller pair 16c are configured so as to rotate forward when the motor 31 rotates forward, and rotate in reverse when the motor 31 rotates in reverse. Accordingly, the transport roller pair 16b is configured so as to transport the document M held by the transport roller pair 16b toward the reading position P1 when the motor 31 rotates forward, and the transport roller pair 16c is configured so as to transport the document M held by the transport roller pair 16c toward the discharge tray 12 when the motor 31 rotates forward. Here, the transport roller pair 16b and the transport roller pair 16c are configured so as not to hold the document M when the motor 31 rotates in reverse.

Furthermore, the document feeding device 1 is provided with an electromagnetic clutch 32. The electromagnetic clutch 32 is disposed in order to transmit or block the driving force of the motor 31 to the drive roller 18a of the discharge roller pair 18. Accordingly, the drive roller 18a of the discharge roller pair 18 is configured so as to, if the electromagnetic clutch 32 is on, rotate forward when the motor 31 rotates forward, and rotate in reverse when the motor 31 rotates in reverse.

Furthermore, the document feeding device 1 is provided with the control unit 33. The control unit 33 includes a CPU, a ROM, a RAM, and the like, and is disposed in order to control the operation of the document feeding device 1. Specifically, the control unit 33 has a function of controlling rotation of the motor 31 and on/off of the electromagnetic clutch 32.

Figure 4:
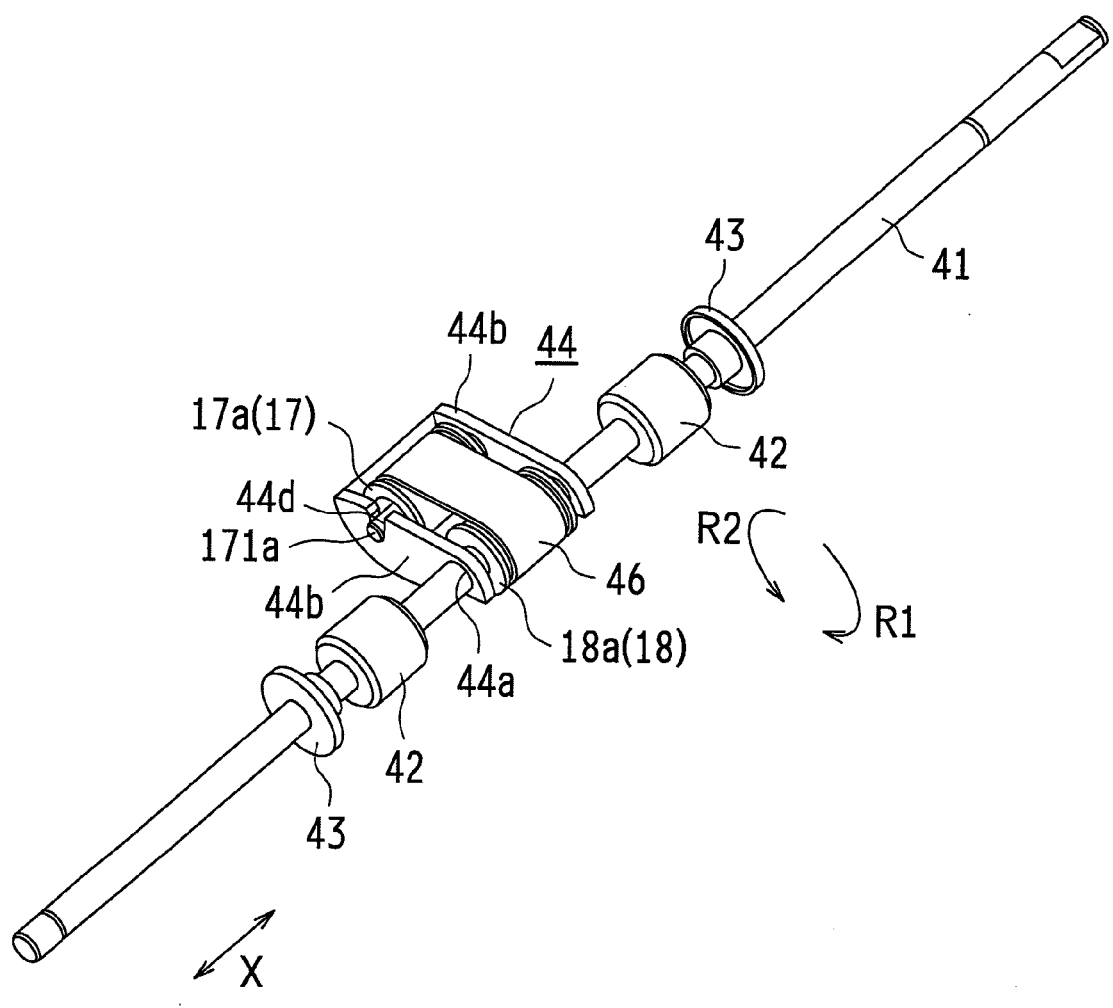
FIG. 4 is a perspective view showing the structures of a drive roller of a discharge roller pair and a drive roller of a transport roller pair of the document feeding device shown in FIG. 2.
Figure 5:
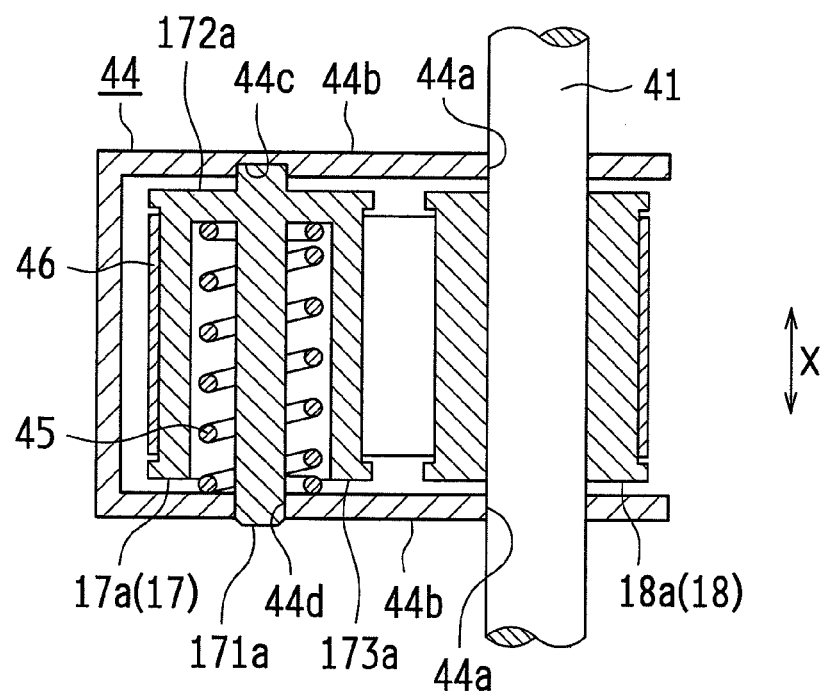
FIG. 5 is a cross-sectional view showing the structures of the drive roller of the discharge roller pair and the drive roller of the transport roller pair shown in FIG. 4.

FIG. 4 is a perspective view showing the structures of the drive roller of the discharge roller pair and the drive roller of the transport roller pair of the document feeding device shown in FIG. 2. FIG. 5 is a cross-sectional view showing the structures of the drive rollers of the discharge roller pair and the transport roller pair shown in FIG. 4. Hereinafter, the structures of the drive roller 18a of the discharge roller pair 18 and the drive roller 17a of the transport roller pair 17 will be described with reference to FIGS. 4 and 5.

The drive roller 18a of the discharge roller pair 18 is attached to a rotation shaft 41. The rotation shaft 41 formed so as to be extended in a direction X orthogonal to the transport direction of the document M (see FIG. 2). The driving force of the motor 31 (see FIG. 3) is transmitted via the electromagnetic clutch 32 (see FIG. 3) to the rotation shaft 41. On the rotation shaft 41, a pair of drive rollers 42 are arranged on the outer sides of the drive roller 18a. The pair of drive rollers 42 together with idler rollers (not shown) respectively constitute discharge roller pairs (not shown).

The drive roller 18a and the drive rollers 42 are attached in a fixed manner to the rotation shaft 41 such that they rotate in accordance with the rotation of the rotation shaft 41. Furthermore, the drive roller 18a of the discharge roller pair 18 is disposed at a position where it is in contact with the idler roller 18b (see FIG. 2).

Furthermore, on the rotation shaft 41, a pair of brim members 43 are attached on the outer sides of the drive rollers 42. The brim members 43 are arranged in order to suppress the document M that is to be discharged above the discharge tray 12 (see FIG. 2) from being warped due to its own weight. Accordingly, a document M that has been already discharged to the discharge tray 12 can be suppressed from being pushed out by a document M that is newly discharged. Furthermore, a leading edge of a document M that is newly discharged to the discharge tray 12 can be suppressed from being caught on a surface of a document M that has been already discharged to the discharge tray 12, and, thus, the newly discharged document M can be suppressed from being bent in the shape of a Z.

Furthermore, a holding member 44 (see FIG. 5) is attached to the rotation shaft 41 in a rotatable manner about the rotation shaft 41. The holding member 44 has a pair of side plates 44b that have insertion holes 44a for allowing insertion of the rotation shaft 41. The pair of side plates 44b are arranged such that the drive roller 18a is interposed therebetween.

The holding member 44 is disposed in order to hold the drive roller 17a of the transport roller pair 17. A shaft bearing portion 44c (see FIG. 5) in the shape of a recess is formed on one of the side plates 44b of the holding member 44, and a cut-out portion 44d is formed on the other side plate 44b.

The drive roller 17a of the transport roller pair 17 is formed in the shape of a cylinder. A rotation shaft portion 171a is formed at the center inside the cylindrical drive roller 17a. Furthermore, one end of the rotation shaft portion 171a is inserted to the shaft bearing portion 44c of the side plate 44b, and another end of the rotation shaft portion 171a is disposed at the cut-out portion 44d of the side plate 44b, and, thus, the drive roller 17a is held by the holding member 44.

One end 172a in the shaft direction X of the cylindrical drive roller 17a is closed, and another end 173a in the shaft direction X is open. A compression coil spring 45 is disposed inside the cylindrical drive roller 17a. Accordingly, the size of the document feeding device can be suppressed from being increased by arranging the compression coil spring 45. Here, the rotation shaft portion 171a is inserted into the compression coil spring 45. The compression coil spring 45 has a function of biasing the drive roller 17a to one of the side plates 44b. That is to say, the compression coil spring 45 has a function of applying a load to the rotation of the drive roller 17a. The compression coil spring 45 in this embodiment corresponds to a "load member" of the present invention.

A belt 46 is stretched between the drive roller 18a of the discharge roller pair 18 and the drive roller 17a of the transport roller pair 17. That is to say, the belt 46 is wound around the drive roller 18a and the drive roller 17a arranged at the two ends. The belt 46 is disposed in order to transmit the driving force of the drive roller 18a to the drive roller 17a. Here, the belt 46 in this embodiment corresponds to a "transmitting member" of the present invention.

Here, flange portions are formed at two ends in the shaft direction X of the surface of the drive roller 18a, and flange portions are formed at two ends in the shaft direction X of the surface of the drive roller 17a. Accordingly, the belt 46 can be suppressed from being slipped off from the drive roller 17a and the drive roller 18a.

Next, the operations of the drive roller 18a of the discharge roller pair 18 and the drive roller 17a of the transport roller pair 17 will be described with reference to FIGS. 4 and 5.

When the Electromagnetic Clutch 32 is Off

When the electromagnetic clutch 32 (see FIG. 3) is off, the rotation shaft 41 to which the drive roller 18a of the discharge roller pair 18 is attached is disconnected from the motor 31 (see FIG. 3). At that time, the drive roller 18a and the rotation shaft 41 can rotate forward and in reverse, the drive roller 17a of the transport roller pair 17 and the holding member 44 can rotate about the rotation shaft 41. Accordingly, the drive roller 17a and the holding member 44 move due to the weight (their own weight) to a position where the holding member 44 engages with an engagement portion (not shown). Here, the position where the holding member 44 engages with the engagement portion is a separation position where the drive roller 17a of the transport roller pair 17 is separated from the idler roller 17b (see FIG. 2).

When the Motor 31 Rotates Forward in the State of Separation Position

When the electromagnetic clutch 32 is turned on, the rotation shaft 41 is connected to the motor 31. Then, if the motor 31 rotates forward in a state where the rotation shaft 41 is connected to the motor 31, the rotation shaft 41 and the drive roller 18a rotate in a forward rotation direction R1. At that time, in the transport roller pair 17 in which the drive roller 17a is positioned at the separation position, the drive roller 17a does not rotate about the rotation shaft portion 171a due to the load applied by the compression coil spring 45.

Accordingly, the drive roller 17a and the holding member 44 move about the rotation shaft 41 in the forward rotation direction R1 to a position where the drive roller 17a is in contact with the idler roller 17b. Thus, the drive roller 17a moves from the separation position to the contact position. Here, the contact position includes a position where the drive roller 17a is in direct contact with the idler roller 17b and a position where the drive roller 17a is in contact via the document M with the idler roller 17b.

Then, after the drive roller 17a is brought into contact with the idler roller 17b, due to the driving force transmitted by the belt 46, the drive roller 17a rotates about the rotation shaft portion 171a in the forward rotation direction R1 resisting the load applied by the compression coil spring 45. That is to say, the drive roller 17a rotates at the contact position about the rotation shaft portion 171a in the forward rotation direction R1.

As a result, when the electromagnetic clutch 32 is on, if the motor 31 rotates forward, the drive roller 18a of the discharge roller pair 18 rotates forward, and the drive roller 17a of the transport roller pair 17 rotates forward at the contact position. Accordingly, the document M held by the transport roller pair 17 and the discharge roller pair 18 is transported toward the discharge tray 12 (see FIG. 2).

When the Motor 31 Rotates in Reverse in the State of Contact Position

When the motor 31 rotates forward, the drive roller 17a is positioned at the contact position. Then, if the motor 31 rotates in reverse in this state, the rotation shaft 41 and the drive roller 18a rotate in a reverse rotation direction R2. At that time, in the transport roller pair 17 in which the drive roller 17a is positioned at the contact position, the drive roller 17a does not rotate about the rotation shaft portion 171a due to the load applied by the compression coil spring 45. Accordingly, the drive roller 17a and the holding member 44 move about the rotation shaft 41 in the reverse rotation direction R2 to a position where the holding member 44 engages with the engagement portion. Thus, the drive roller 17a moves from the contact position to the separation position.

Then, after the holding member 44 engages with the engagement portion, due to the driving force transmitted by the belt 46, the drive roller 17a rotates about the rotation shaft portion 171a in the reverse rotation direction R2 resisting the load applied by the compression coil spring 45. That is to say, the drive roller 17a rotates at the separation position about the rotation shaft portion 171a in the reverse rotation direction R2.

As a result, when the electromagnetic clutch 32 is on and the drive roller 17a of the transport roller pair 17 is positioned at the contact position, if the motor 31 rotates in reverse, the drive roller 17a of the transport roller pair 17 moves to the separation position, and the drive roller 18a of the discharge roller pair 18 rotates in reverse. Accordingly, the document M held by the discharge roller pair 18 is transported via the transport path 13c toward the transport path 13a (see FIG. 2).

In this embodiment, since the belt 46 that transmits the driving force of the drive roller 18a of the discharge roller pair 18 to the drive roller 17a of the transport roller pair 17 and the compression coil spring 45 that applies a load to the rotation of the drive roller 17a are provided as described above, it is possible to move the drive roller 17a of the transport roller pair 17 between the contact position and the separation position without additionally providing a driving source such as an actuator.

Figure 6:
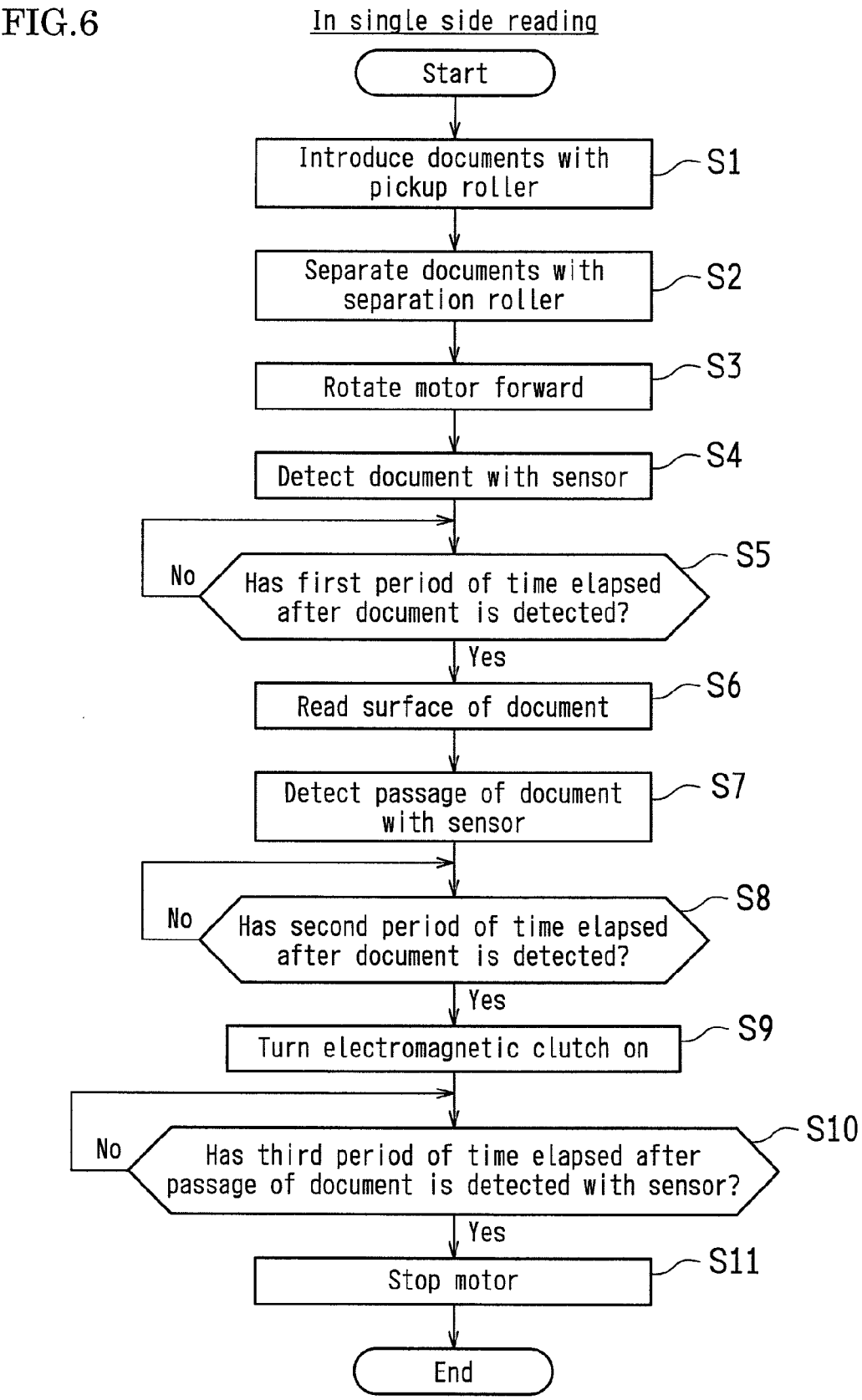
FIG. 6 is a flowchart for illustrating the operation of the image forming apparatus according to this embodiment at the time of single side reading.
Figure 7:
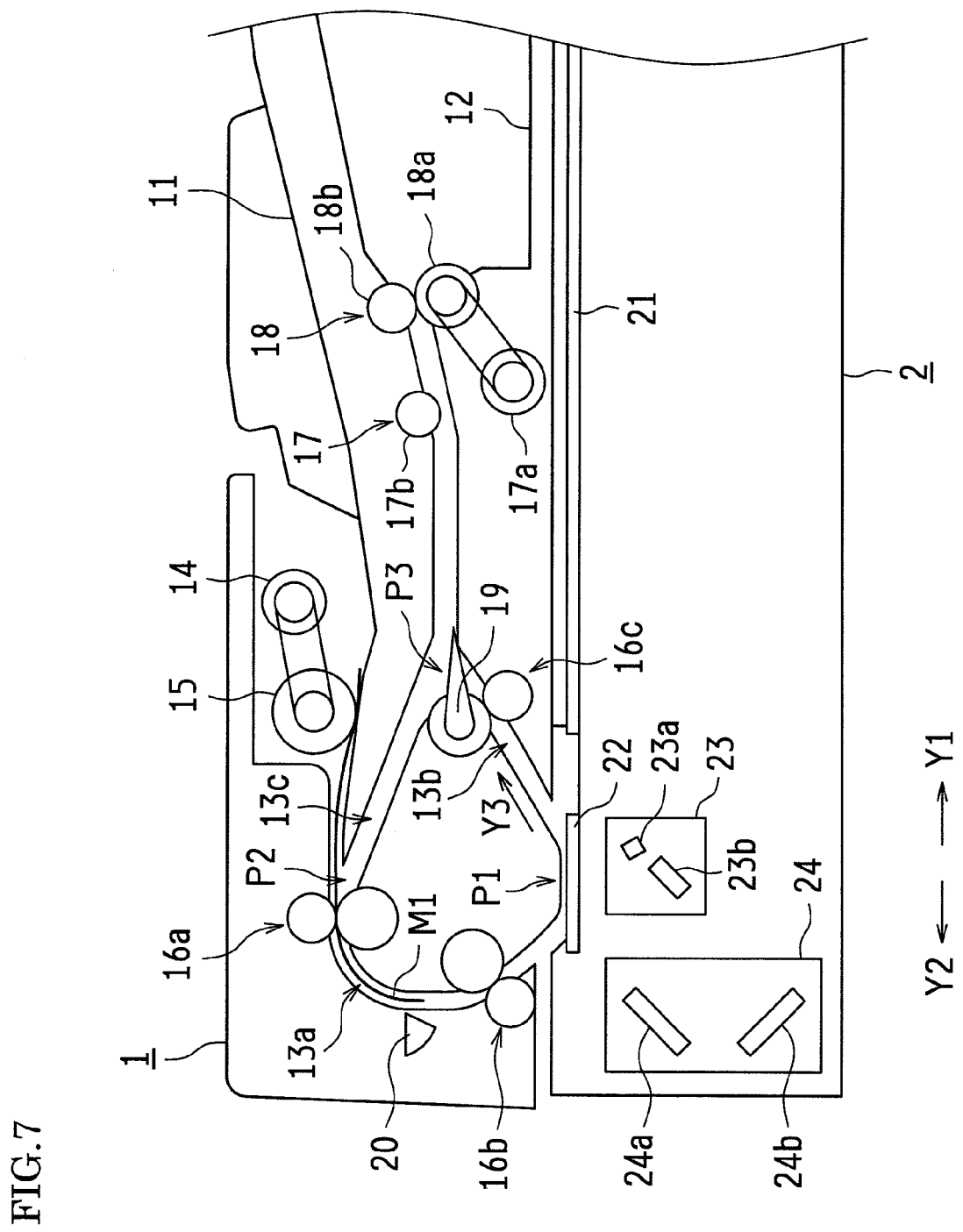
FIG. 7 is a view showing a state in which a leading edge of a document has been detected by a sensor of the document feeding device shown in FIG. 2.
Figure 8:
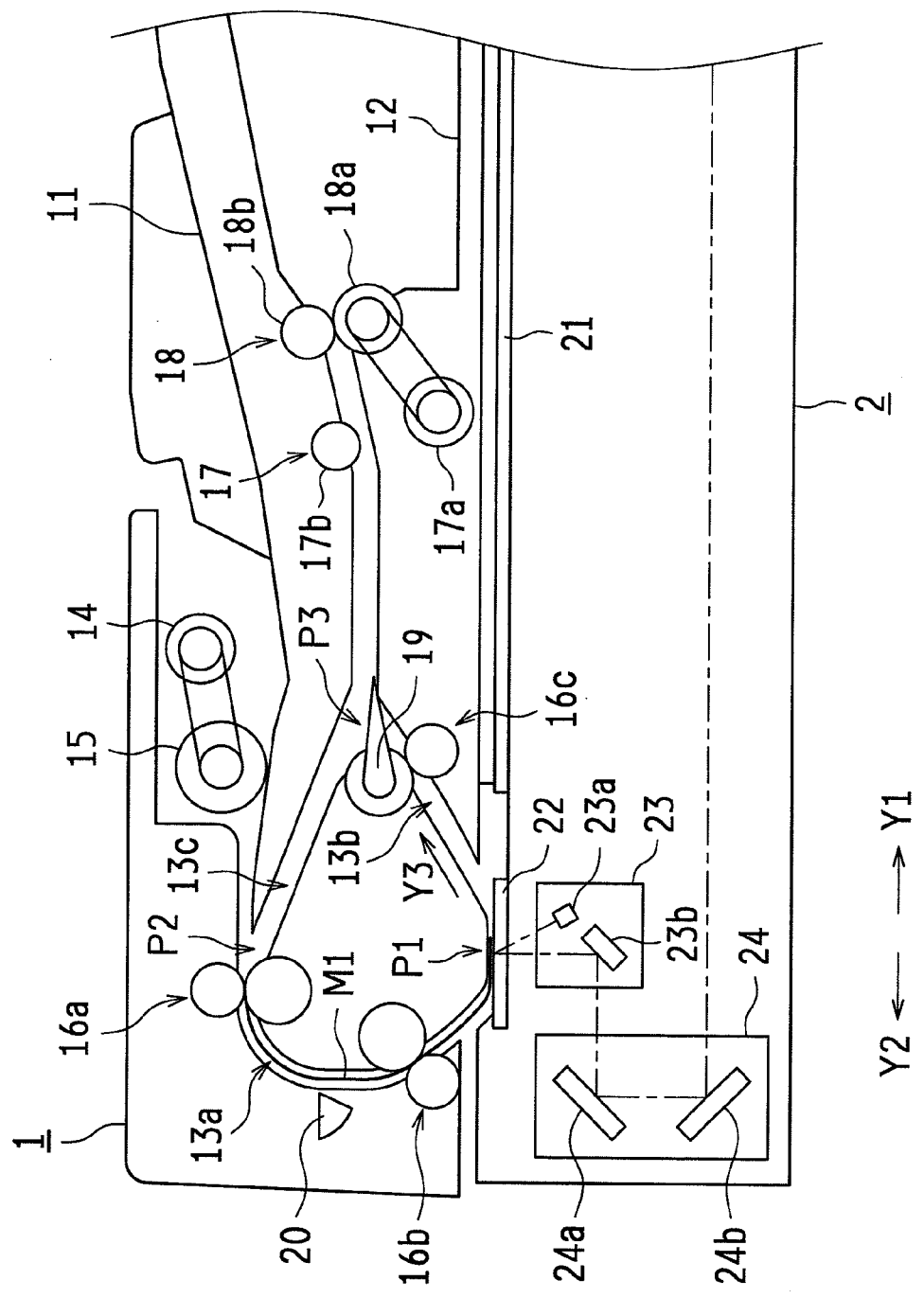
FIG. 8 is a view showing a state in which a leading edge of a document has been transported to a reading position of the document feeding device shown in FIG. 2.
Figure 9:
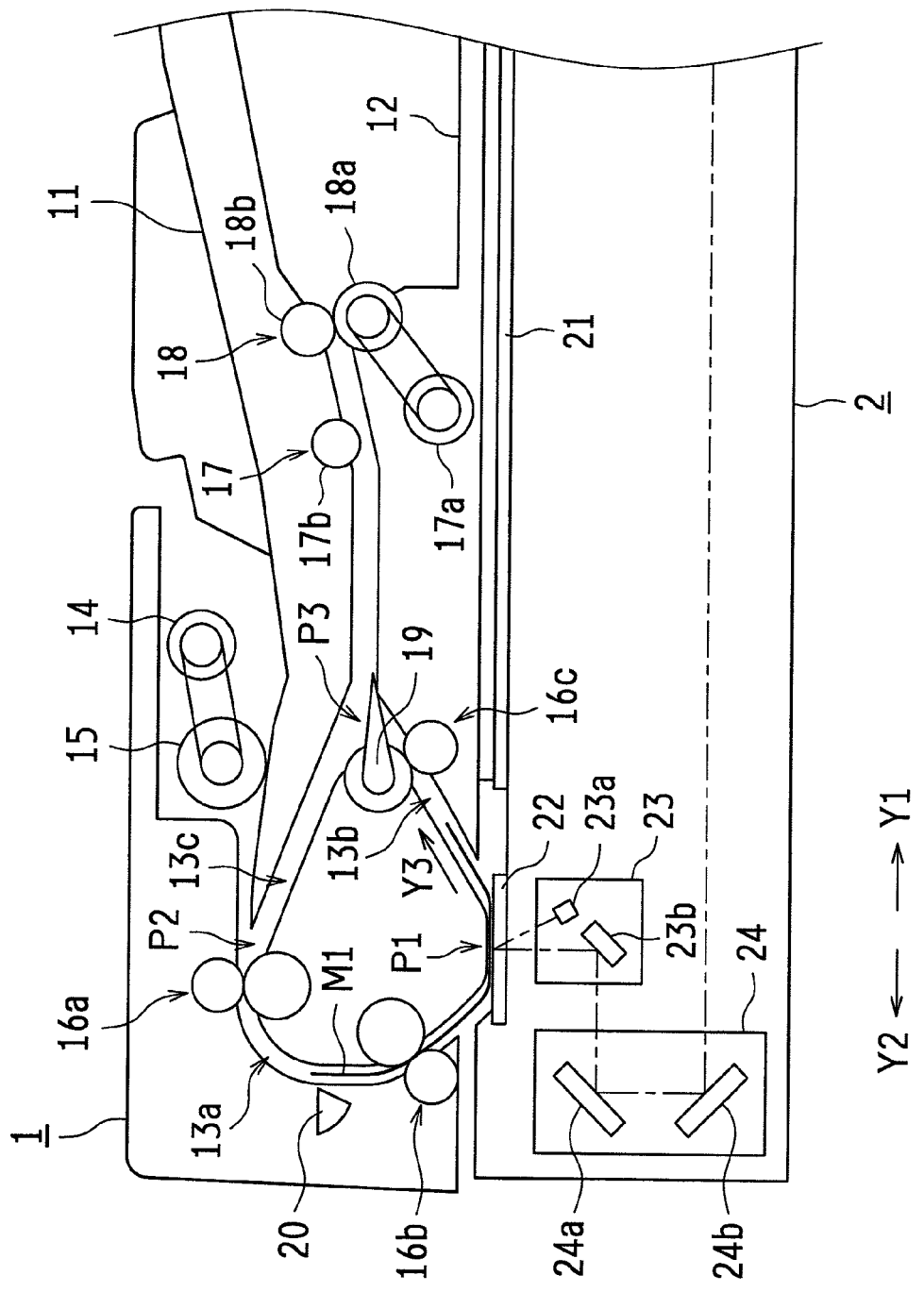
FIG. 9 is a view showing a state in which the passage of a document has been detected by the sensor of the document feeding device shown in FIG. 2.
Figure 10:
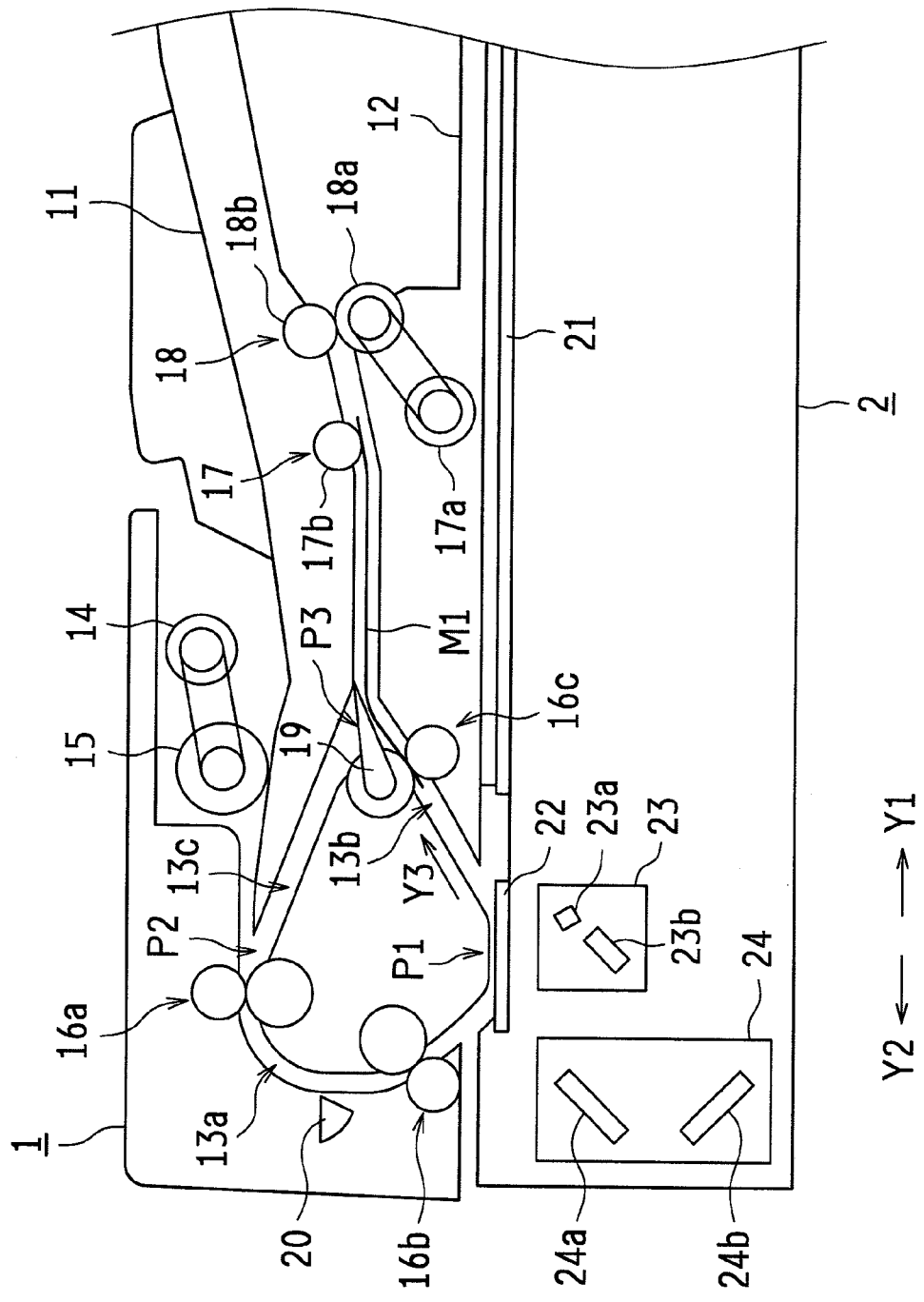
FIG. 10 is a view showing a state in which a leading edge of a document is positioned between the rollers of the transport roller pair of the document feeding device shown in FIG. 2.
Figure 11:
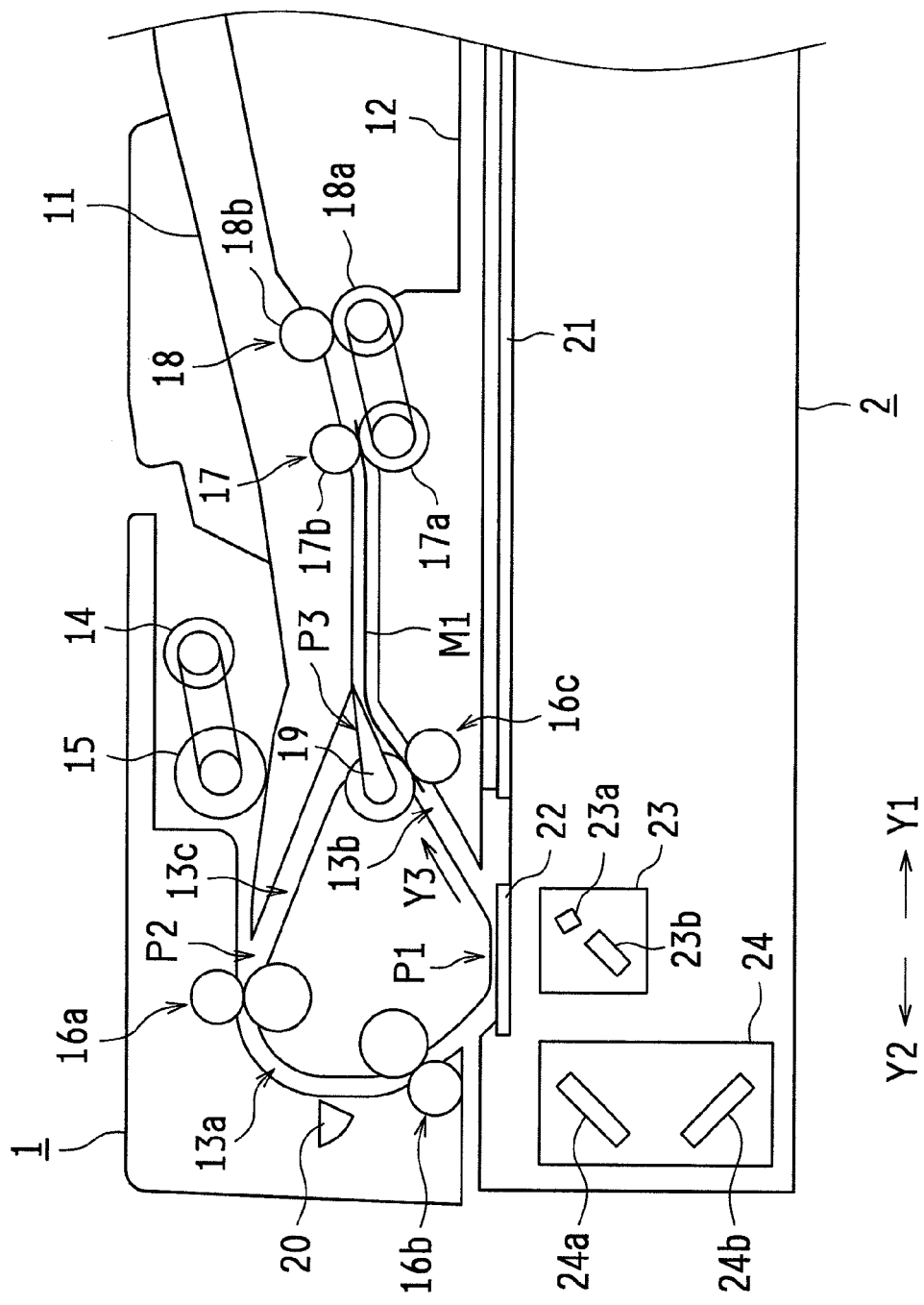
FIG. 11 is a view showing a state in which a leading edge of a document is held by the transport roller pair of the document feeding device shown in FIG. 2.
Figure 12:
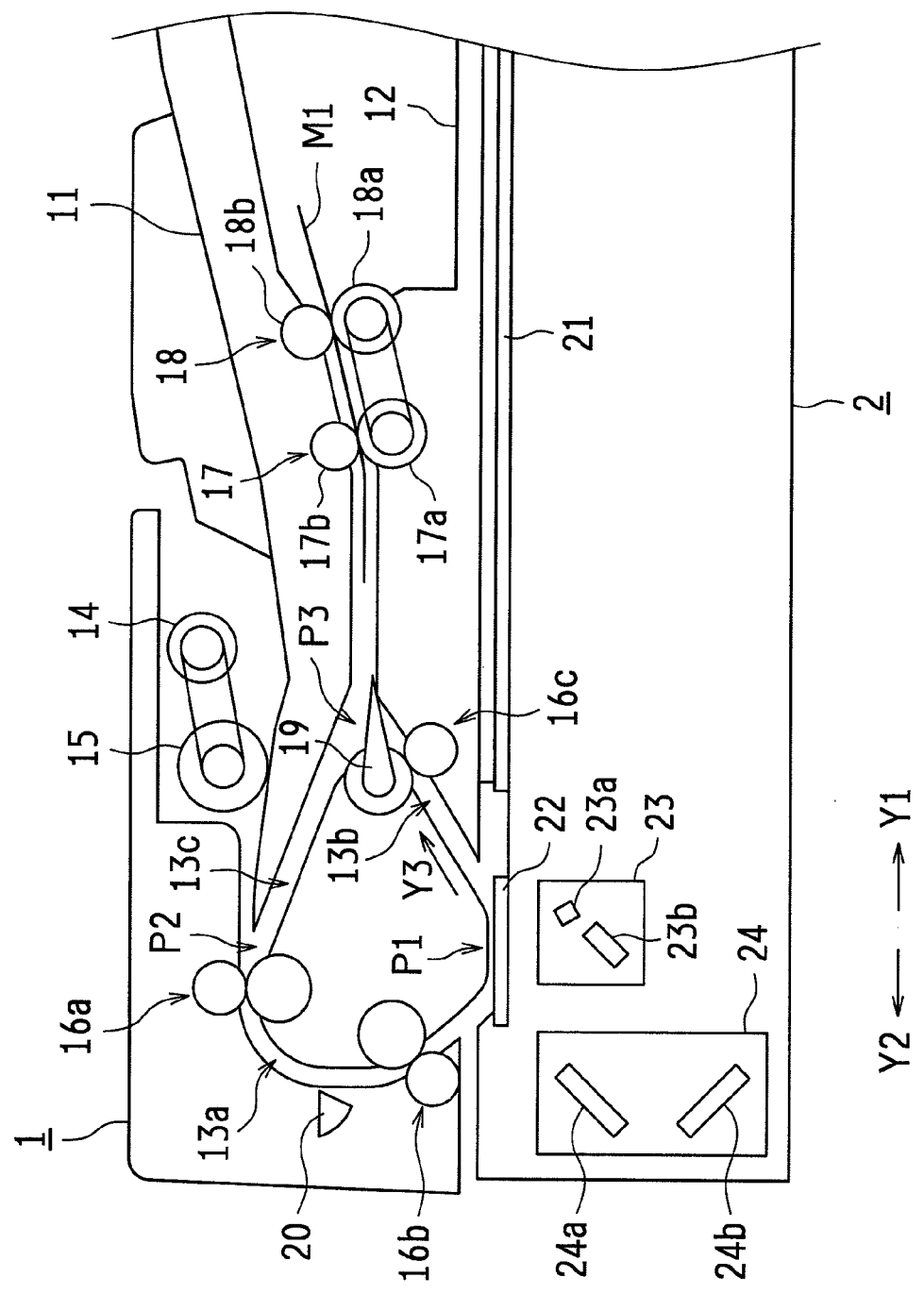
FIG. 12 is a view showing a state in which a document is transported by the transport roller pair of the document feeding device shown in FIG. 2.

FIG. 6 is a flowchart for illustrating the operation of the image forming apparatus according to this embodiment at the time of single side reading. FIGS. 7 to 12 are front views for illustrating the operation of the image forming apparatus according to this embodiment at the time of single side reading. Hereinafter, the operation of the image forming apparatus 100 (see FIG. 1) according to this embodiment at the time of single side reading will be described with reference to FIGS. 6 to 12. The following description will be given of an exemplary operation that reads one face of a document M1 (see FIG. 7) having the minimum length in the transport direction, among documents that can be transported by the document feeding device 1. The document M1 is, for example, a business card having a length in the transport direction of about 91 mm.

First, the pickup roller 14 (see FIG. 2) introduces the document M1 placed face up on the document tray 11 into the document feeding device 1. Then, the document M1 is passed to the separation roller 15 (see FIG. 2). (Step S1)

Next, the separation roller 15 separates the documents M1 introduced into the document feeding device 1, and the documents M1 are fed sheet by sheet to the transport path 13a. Then, the documents M1 are each transported on the transport path 13a. (Step S2)

The control unit 33 (see FIG. 3) causes the motor 31 (see FIG. 3) to rotate forward. Accordingly, the transport roller pairs 16a to 16c rotate forward. Then, the transport roller pair 16a transports the document M1 on the transport path 13a. Here, at that time, the electromagnetic clutch 32 (see FIG. 3) is off, and the driving force of the motor 31 is not transmitted to the drive roller 18a of the discharge roller pair 18. Accordingly, the drive roller 17a of the transport roller pair 17 is positioned at the separation position. (Step S3)

The document M1 transported on the transport path 13a pushes the lever (not shown) out of the transport path 13a. Thus, the sensor 20 detects the movement of the lever. Accordingly, based on the detection results of the sensor 20, the control unit 33 determines that the document M1 (see FIG. 7) is positioned near the transport roller pair 16b on the upstream side of the transport roller pair 16b. (Step S4)

The control unit 33 determines whether or not a first period of time has elapsed after the sensor 20 detects the document M1. Then, if it is determined that the first period of time has elapsed, the procedure advances to Step S6. On the other hand, if it is determined that the first period of time has not elapsed, Step S5 is repeated. Here, the first period of time is a preset period of time from when the leading edge of the document M1 is detected by the sensor 20 to when the leading edge is transported to the reading position P1 (see FIG. 8). (Step S5)

The image reading unit 2 reads an image of the surface of the document M1 that passes through the reading position P1. Specifically, light is emitted from the light source 23a of the light source unit 23. At that time, the light emitted from the light source 23a illuminates the document M1 via the document reading glass 22. Then, light reflected by the document M1 travels via the document reading glass 22, the mirror 23b of the light source unit 23, and the mirror 24a and the mirror 24b of the mirror unit 24, and is incident on the imaging unit 25 (see FIG. 2). Here, reading of the surface of the document M1 is continued until the trailing edge of the document M1 has been transported through the reading position P1. Then, the document M1 that passed through the reading position P1 is transported to the transport path 13b. Subsequently, the document M1 transported in the transport direction Y3 on the transport path 13b pushes the claw member 19 up during the transport. At that time, the document M1 is transported by the transport roller pairs 16a to 16c. (Step S6)

When the trailing edge of the document M1 that is being transported passes through a point near the transport roller pair 16b on the upstream side of the transport roller pair 16b, the lever (not shown) returns to the original position where it blocks the transport path 13a. Thus, the sensor 20 detects the movement of the lever. Accordingly, based on the detection results of the sensor 20, the control unit 33 determines that the document M1 (see FIG. 9) has passed through a point near the transport roller pair 16b on the upstream side of the transport roller pair 16b. (Step S7)

The control unit 33 determines whether or not a second period of time has elapsed after the sensor 20 detects the document M1. Then, if it is determined that the second period of time has elapsed, the procedure advances to Step S9. On the other hand, if it is determined that the second period of time has not elapsed, Step S8 is repeated. Here, the second period of time is a period of time from when the leading edge of the document M1 is detected by the sensor 20 to when the leading edge is transported to a point between the rollers of the transport roller pair 17 (see FIG. 10). Furthermore, the second period of time is a preset period of time that is longer than the first period of time. Accordingly, if the second period of time has elapsed, the leading edge of the document M1 is positioned between the rollers of the transport roller pair 17. (Step S8)

The control unit 33 turns the electromagnetic clutch 32 on. Accordingly, the driving force of the motor 31 is transmitted to the drive roller 18a of the discharge roller pair 18. Accordingly, the drive roller 18a rotates forward, and the drive roller 17a of the transport roller pair 17 moves from the separation position to the contact position. Then, the drive roller 17a (see FIG. 11) rotates forward at the contact position. Accordingly, the transport roller pair 17 and the discharge roller pair 18 (see FIG. 12) transport the document M1 in the transport direction Y1. A detailed operation performed when the electromagnetic clutch 32 is turned on is as described above. (Step S9)

The control unit 33 determines whether or not a third period of time has elapsed after the sensor 20 detects the passage of the document M1. Then, if it is determined that the third period of time has elapsed, the procedure advances to Step S11. On the other hand, if it is determined that the third period of time has not elapsed, Step S10 is repeated. Here, the third period of time is a preset period of time from when the trailing edge of the document M1 passes by the sensor 20 to when the trailing edge is transported through the discharge roller pair 18. Accordingly, if the third period of time has elapsed, the discharge roller pair 18 has discharged the document M1 face down to the discharge tray 12. (Step S10)

The control unit 33 stops the driving of the motor 31. Thus, the operation at the time of single side reading ends. (Step S11)

In this embodiment, since the transport roller pair 17 having the drive roller 17a that rotates forward at the contact position when the drive roller 18a of the discharge roller pair 18 rotates forward is provided as described above, it is possible for small-sized documents M1 such as business cards to be transported by the transport roller pair 17 to the discharge roller pair 18 even in the case where the transport distance to the discharge roller pair 18 (switchback path) is long. Furthermore, it is not necessary to provide a constituent element such as an actuator for separating the rollers of the discharge roller pair 18 from each other, and, thus, the transport mechanism for the document M1 can be suppressed from being complicated. As a result, the need for providing an actuator or the like has been eliminated in order to suppress the transport mechanism from being complicated, and even small-sized documents M1 can be properly transported in the case where the transport distance to the discharge roller pair 18 is long.

Figure 13:
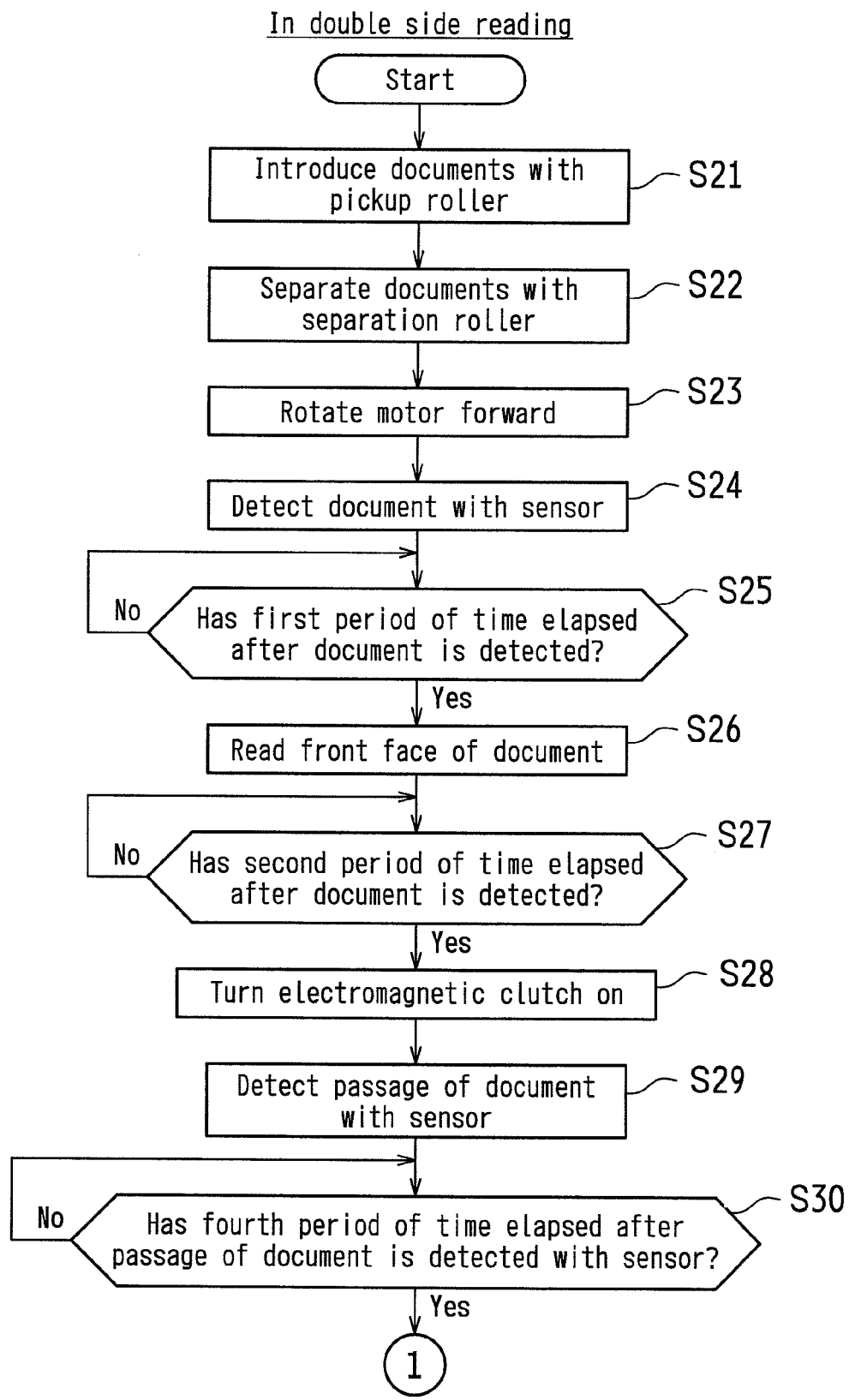
FIG. 13 is a flowchart for illustrating the operation of the image forming apparatus according to this embodiment at the time of double side reading.
Figure 14:
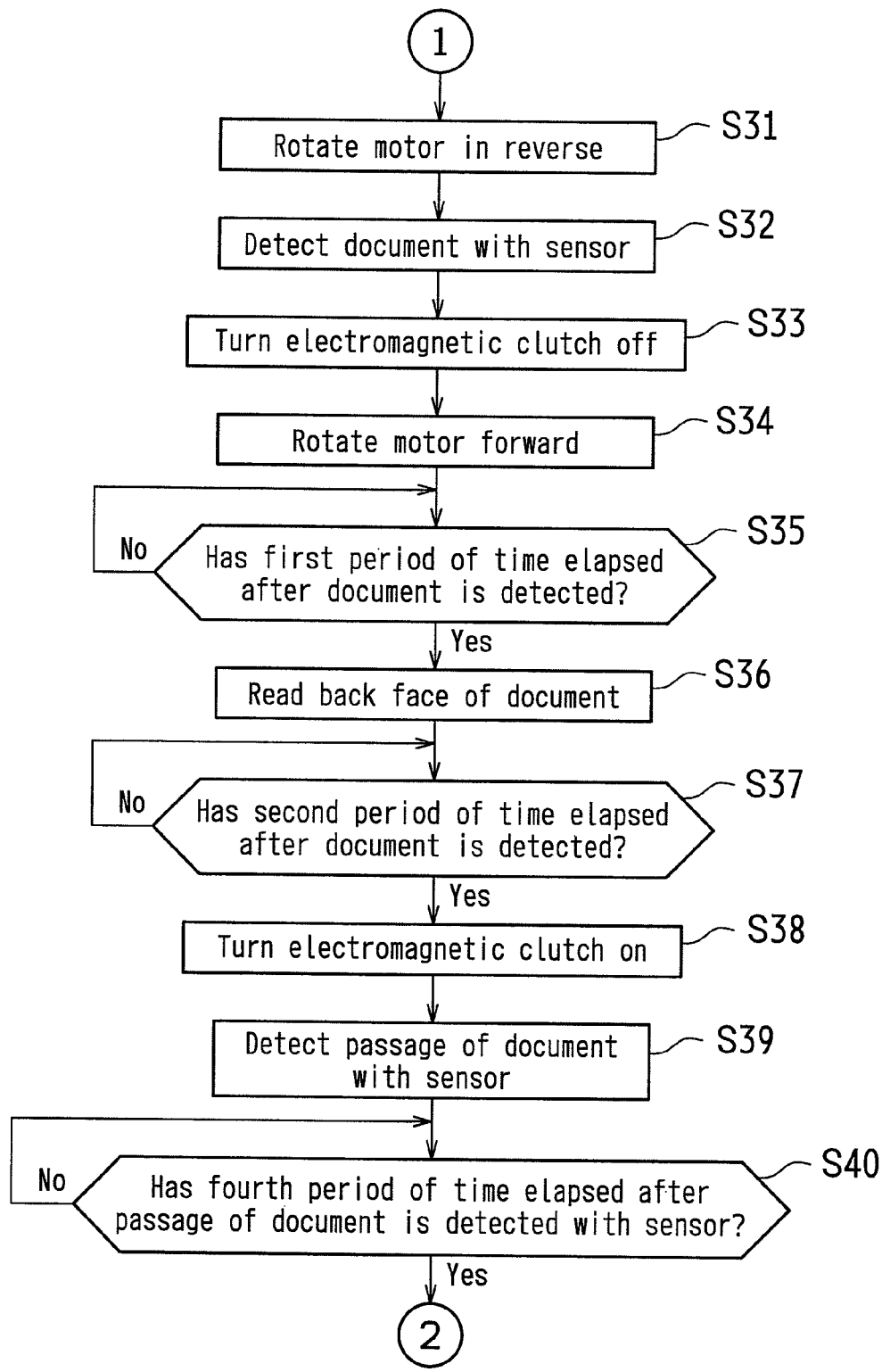
FIG. 14 is a flowchart for illustrating the operation of the image forming apparatus according to this embodiment at the time of double side reading.
Figure 15:
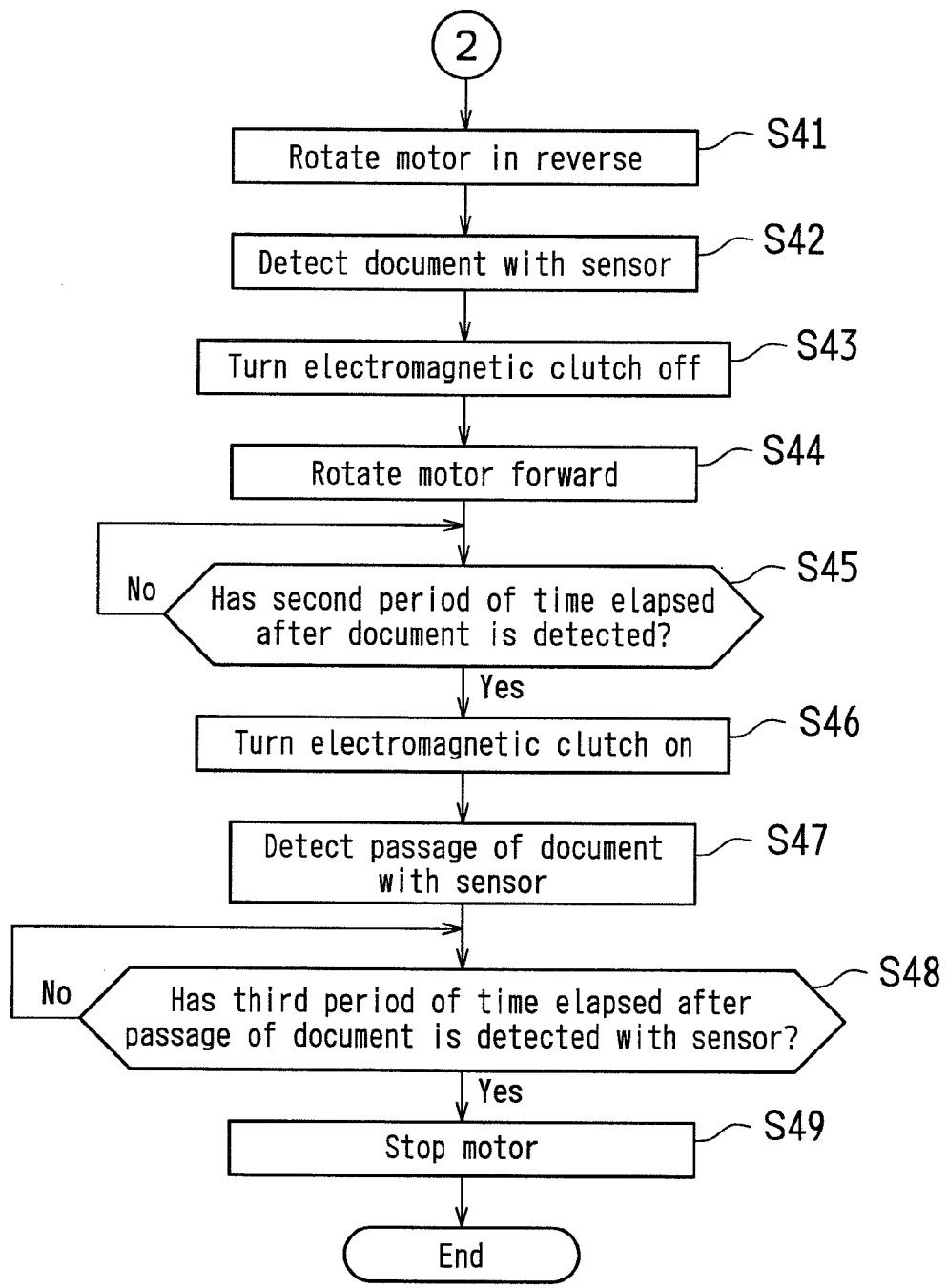
FIG. 15 is a flowchart for illustrating the operation of the image forming apparatus according to this embodiment at the time of double side reading.
Figure 16:
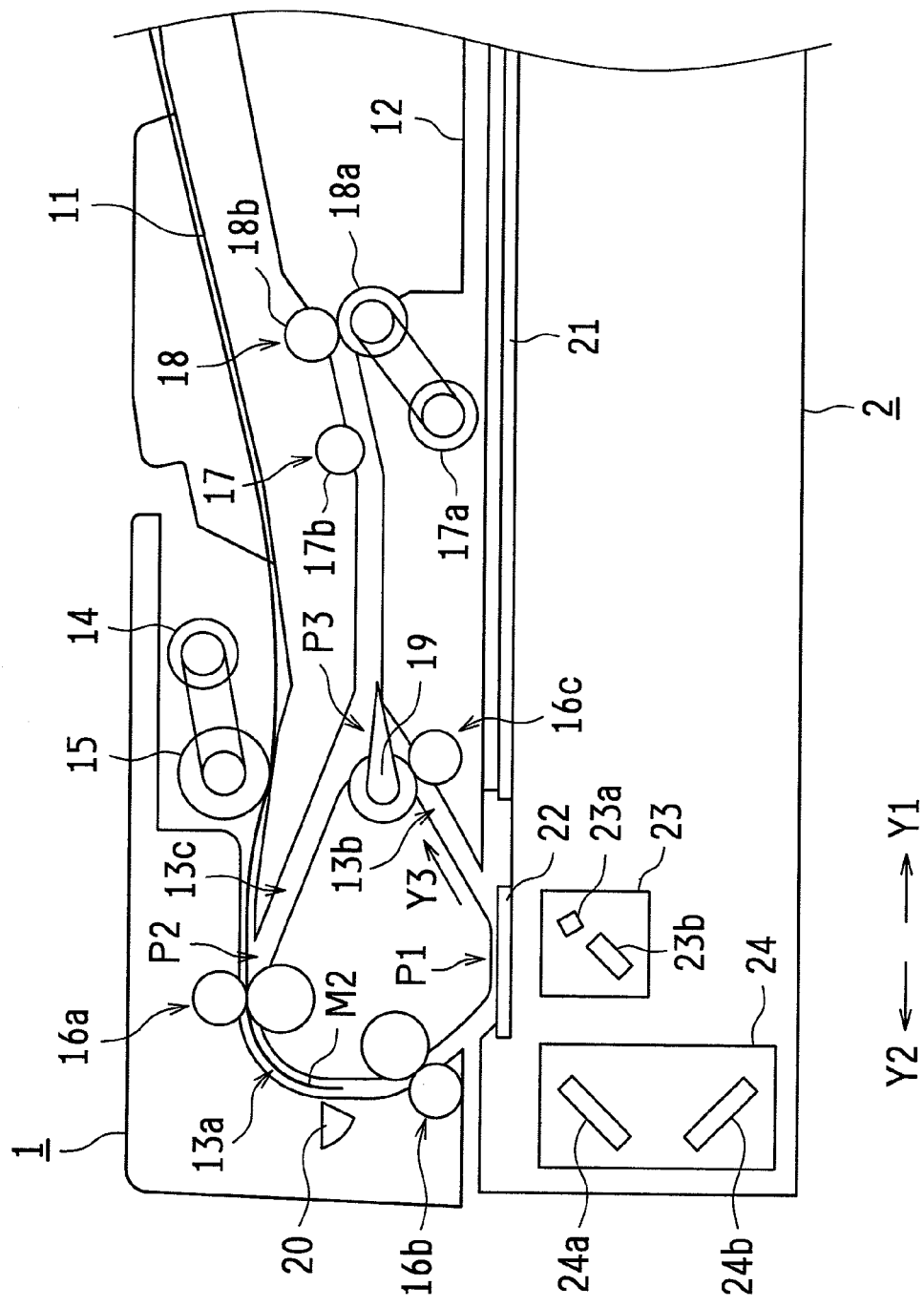
FIG. 16 is a view showing a state in which a leading edge of a document has been detected by the sensor of the document feeding device shown in FIG. 2.
Figure 17:
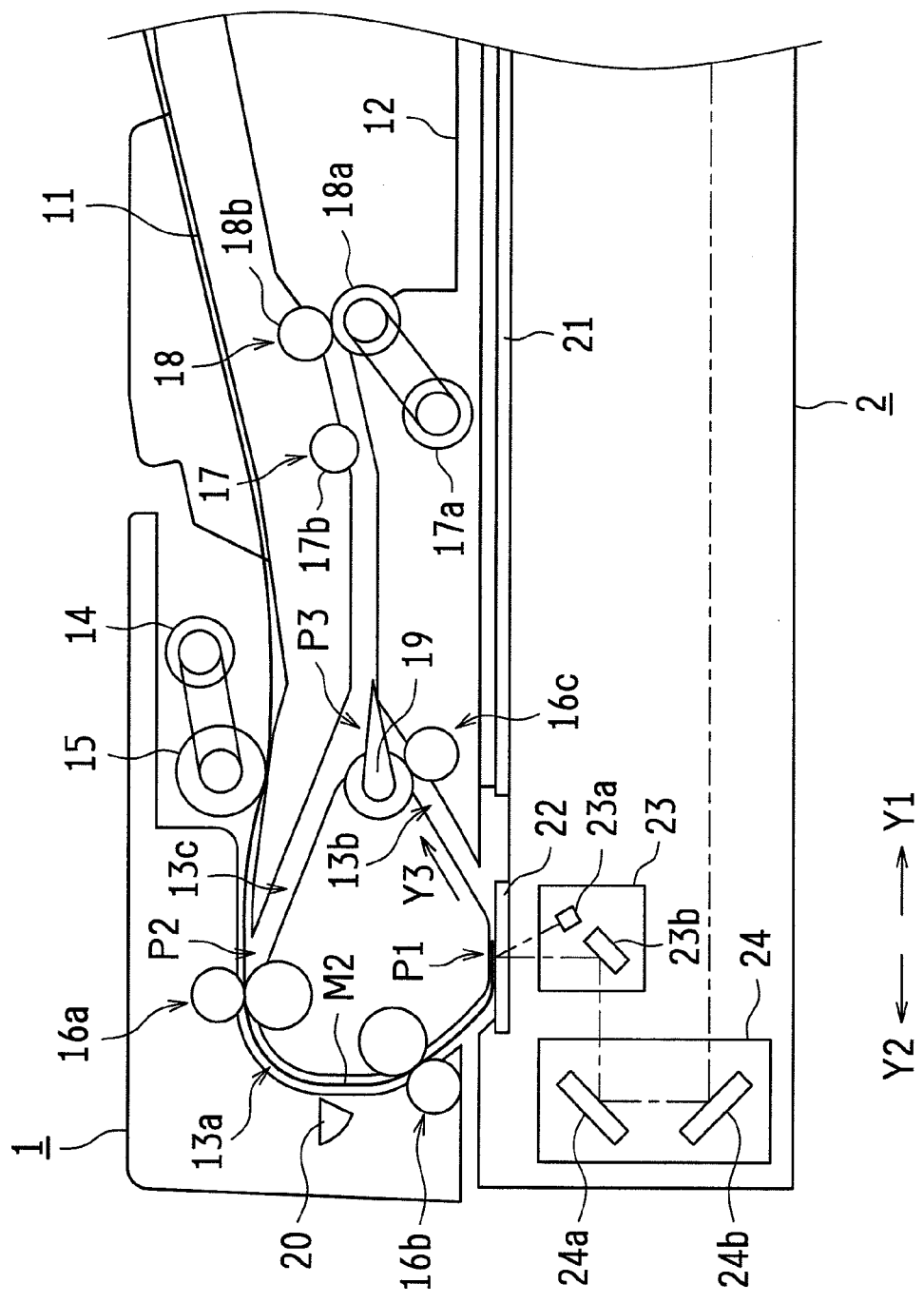
FIG. 17 is a view showing a state in which a leading edge of a document has been transported to the reading position of the document feeding device shown in FIG. 2.
Figure 18:
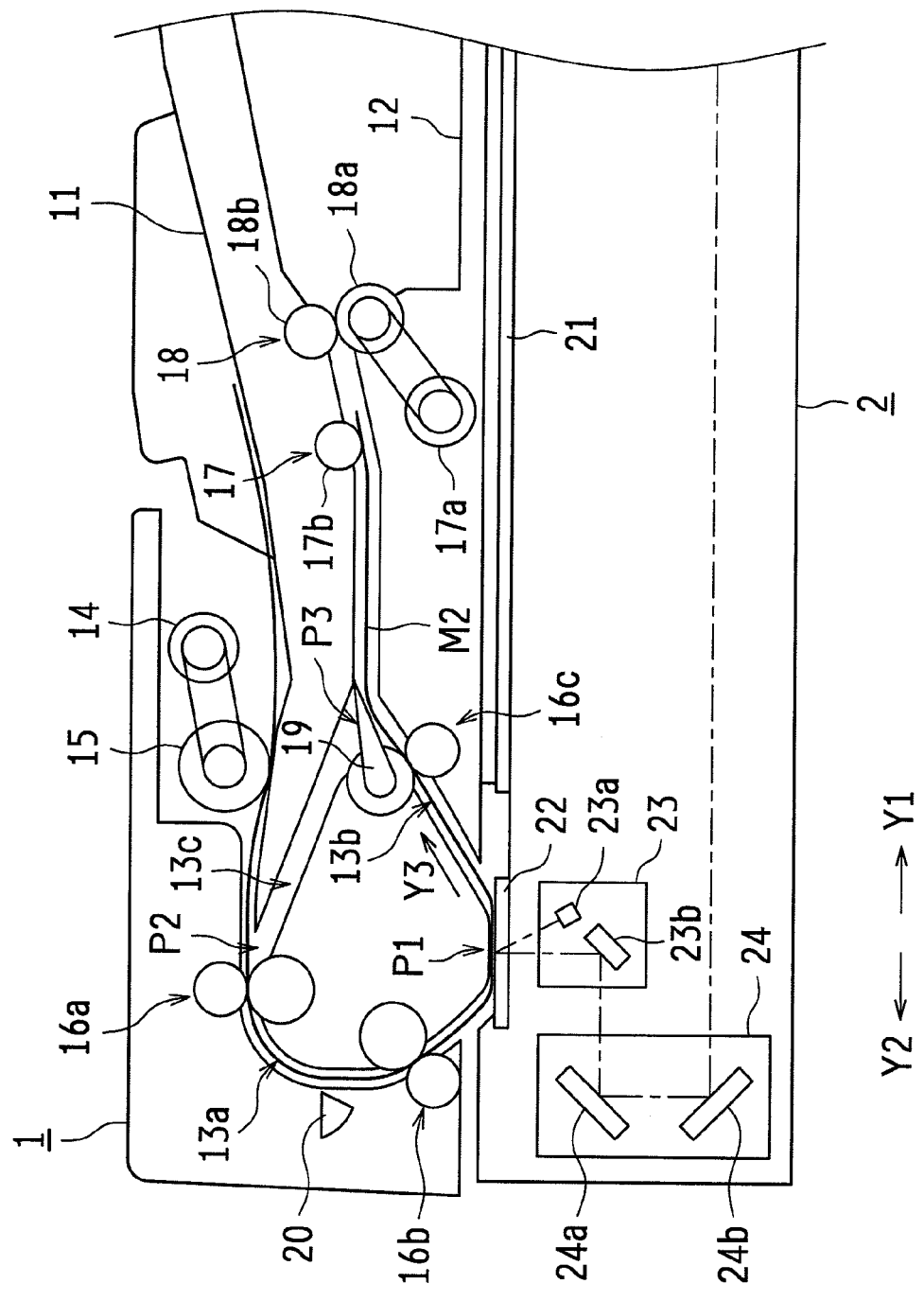
FIG. 18 is a view showing a state in which a leading edge of a document is positioned between the rollers of the transport roller pair of the document feeding device shown in FIG. 2.
Figure 19:
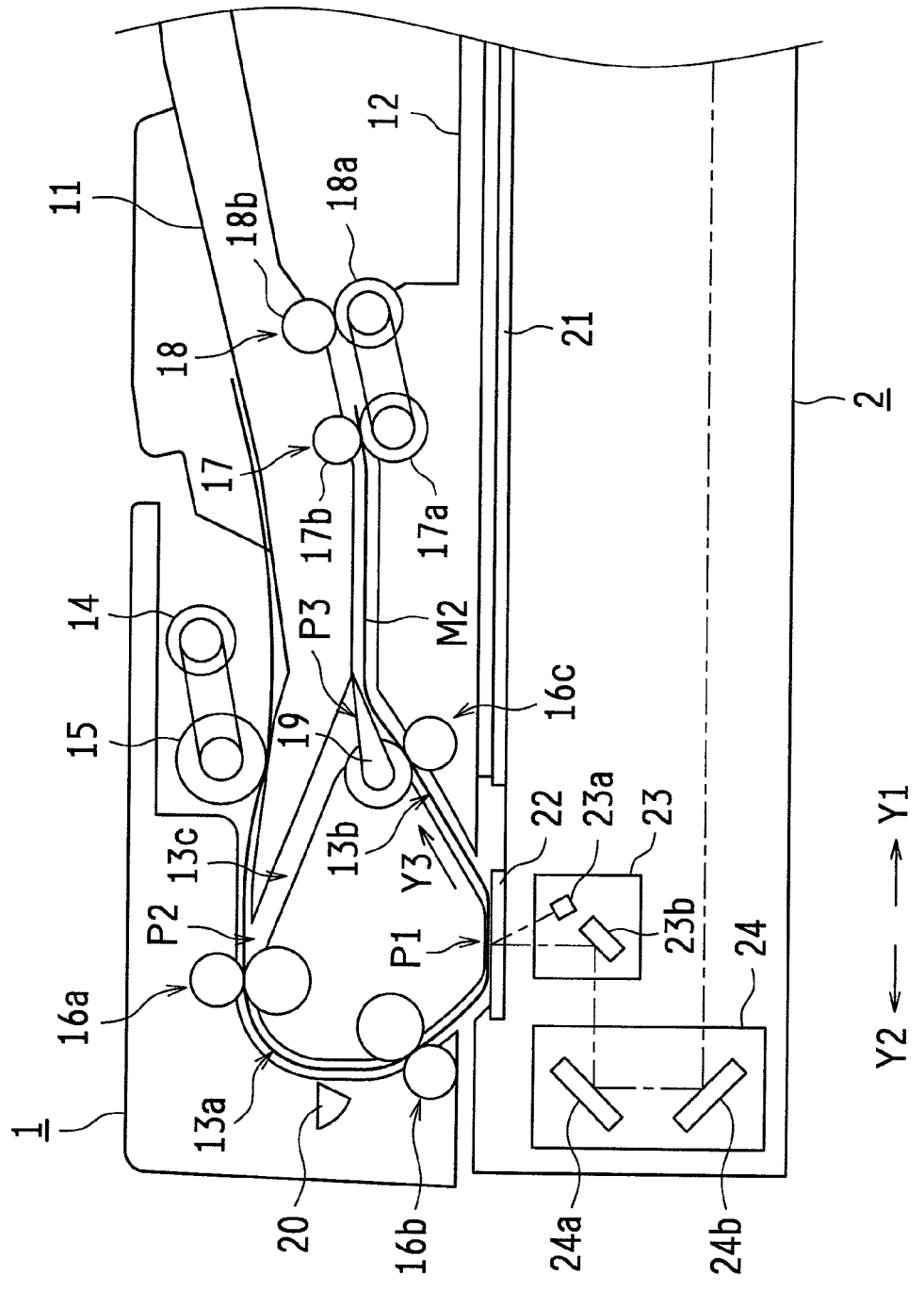
FIG. 19 is a view showing a state in which a leading edge of a document is held by the transport roller pair of the document feeding device shown in FIG. 2.
Figure 20:
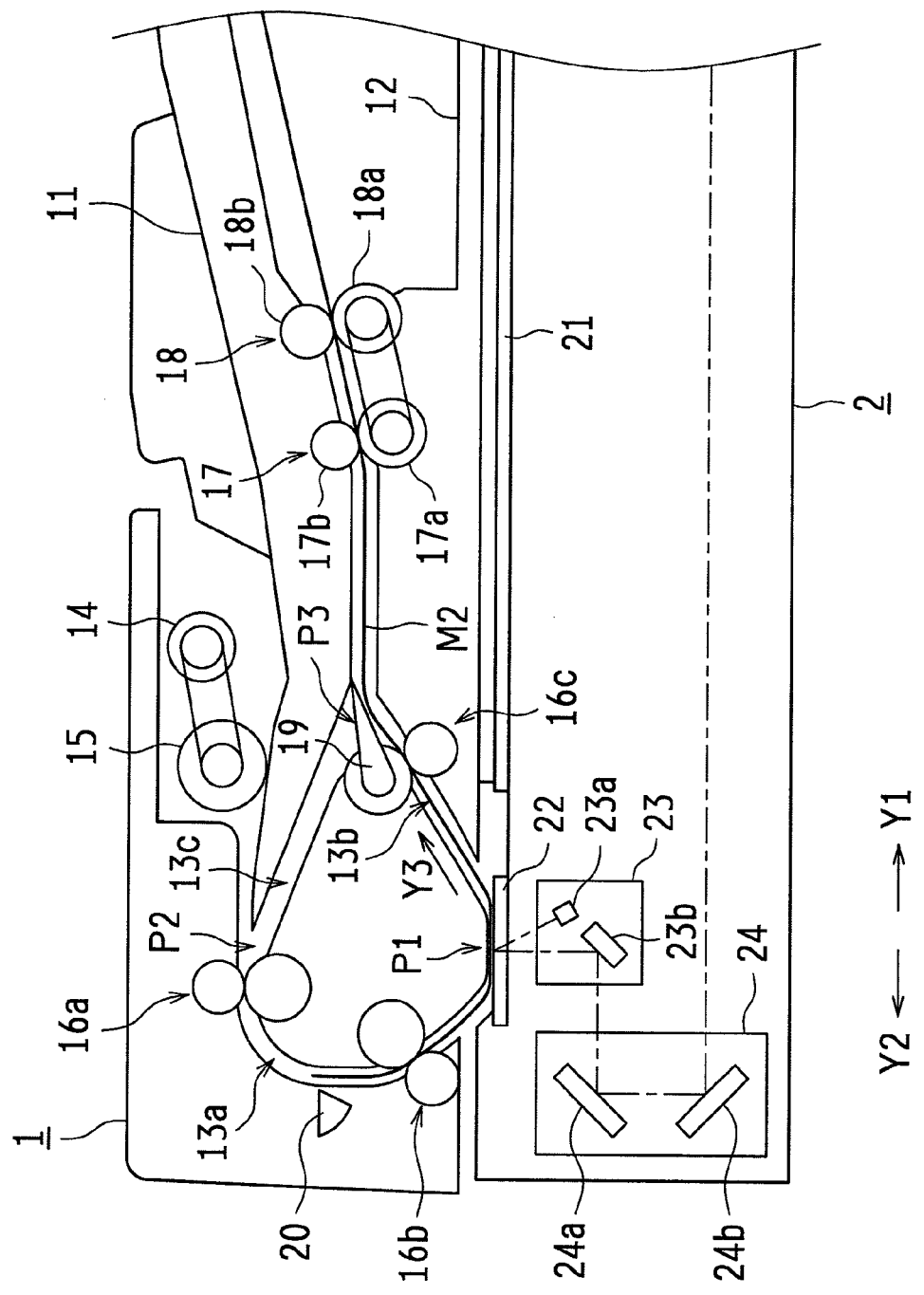
FIG. 20 is a view showing a state in which the passage of a document has been detected by the sensor of the document feeding device shown in FIG. 2.
Figure 21:
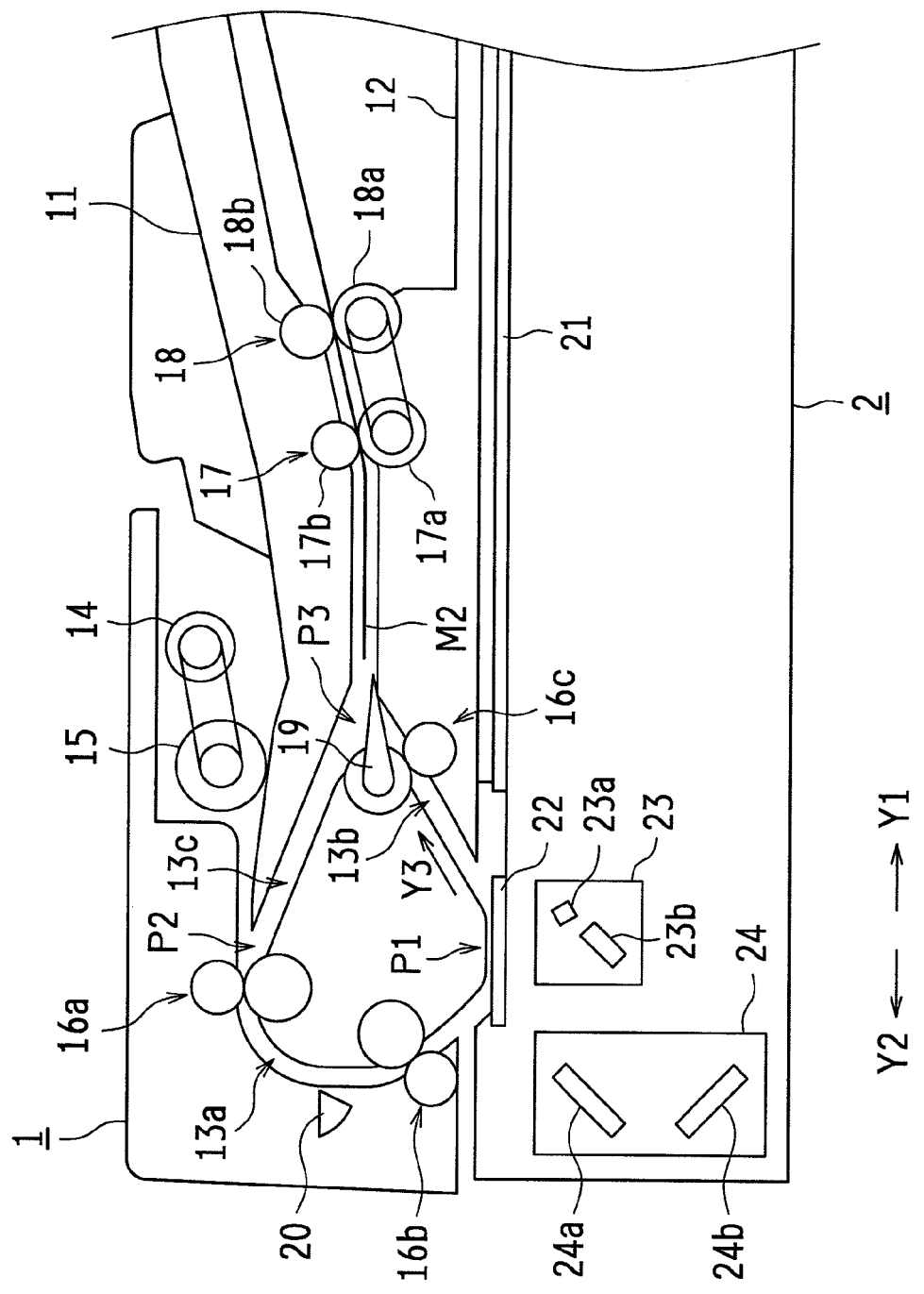
FIG. 21 is a view showing a state in which a trailing edge of a document has been transported through a linking point in the document feeding device shown in FIG. 2.
Figure 22:
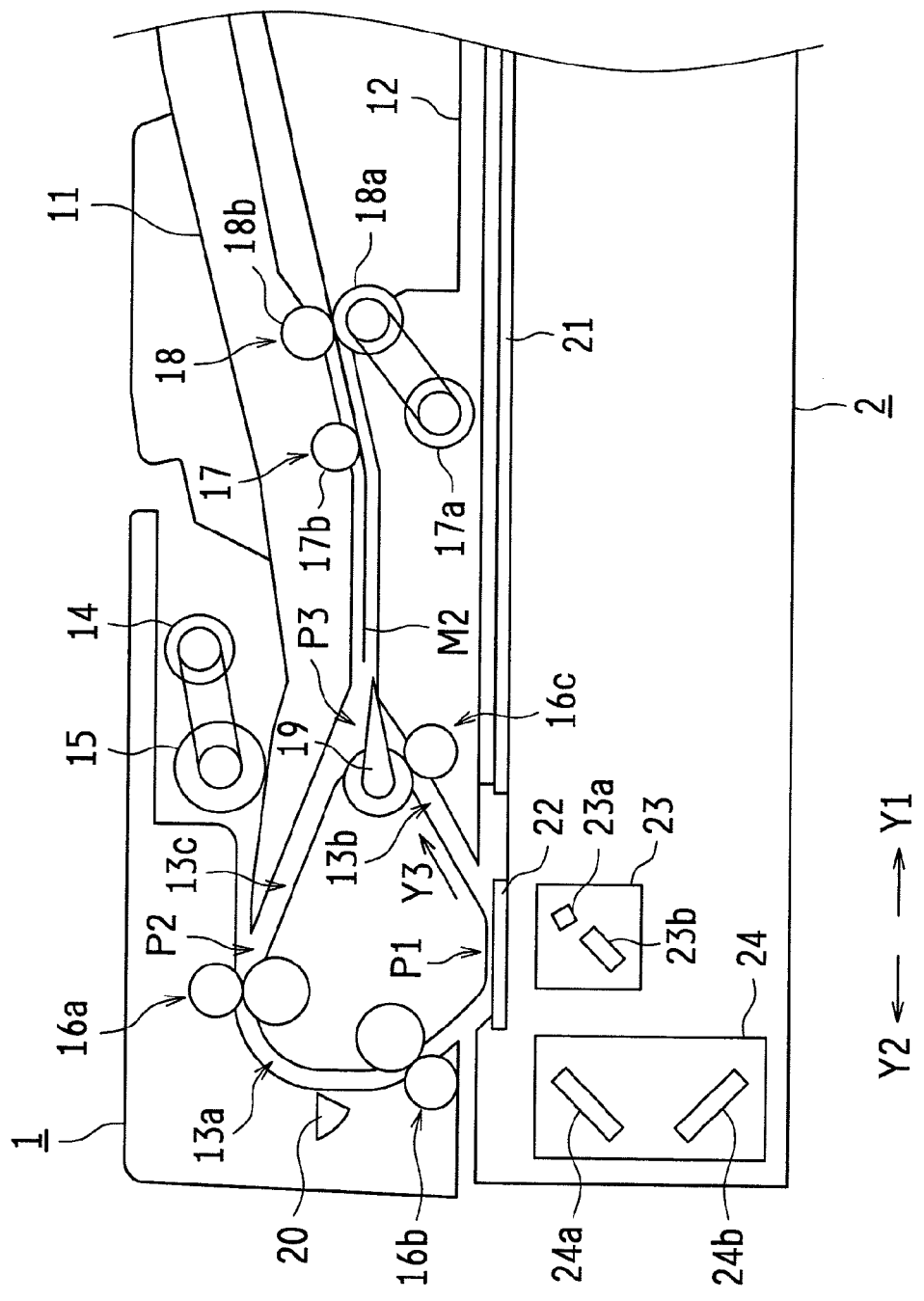
FIG. 22 is a view showing a state in which the drive roller of the transport roller pair is separated in the document feeding device shown in FIG. 2.
Figure 23:
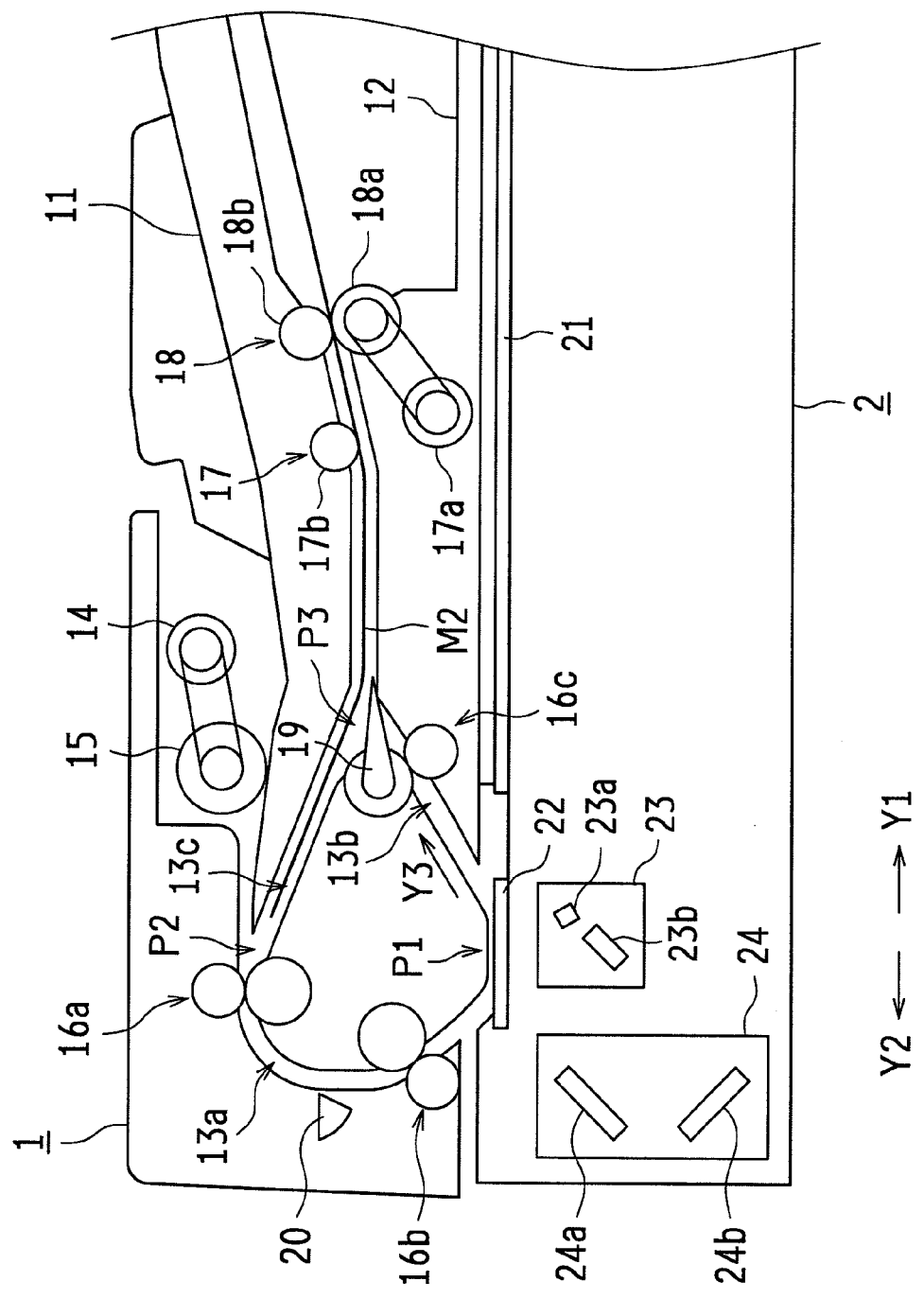
FIG. 23 is a view showing a state in which a document is returned by the discharge roller pair in the document feeding device shown in FIG. 2.
Figure 24:
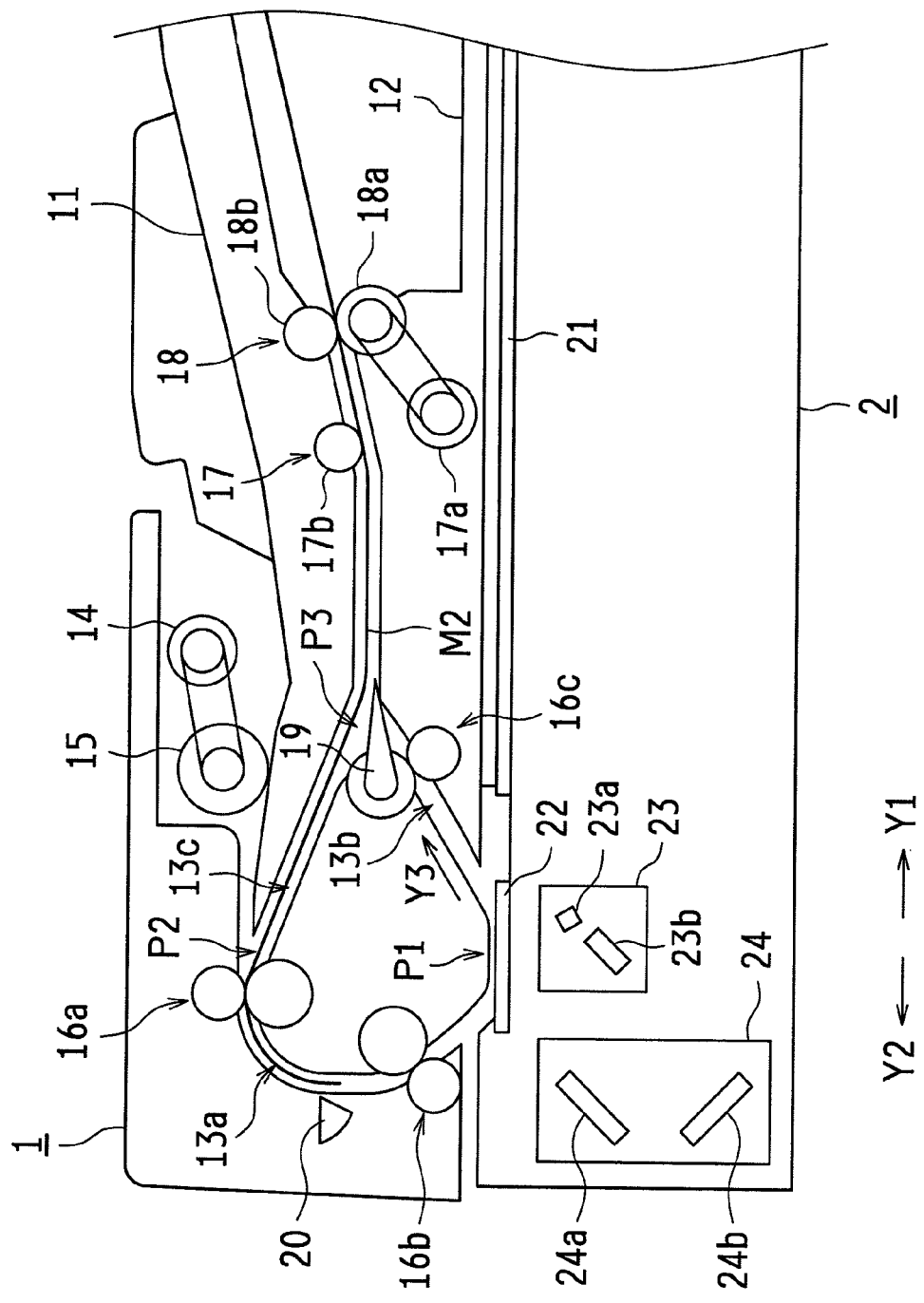
FIG. 24 is a view showing a state in which a leading edge of a document has been detected by the sensor of the document feeding device shown in FIG. 2.
Figure 25:
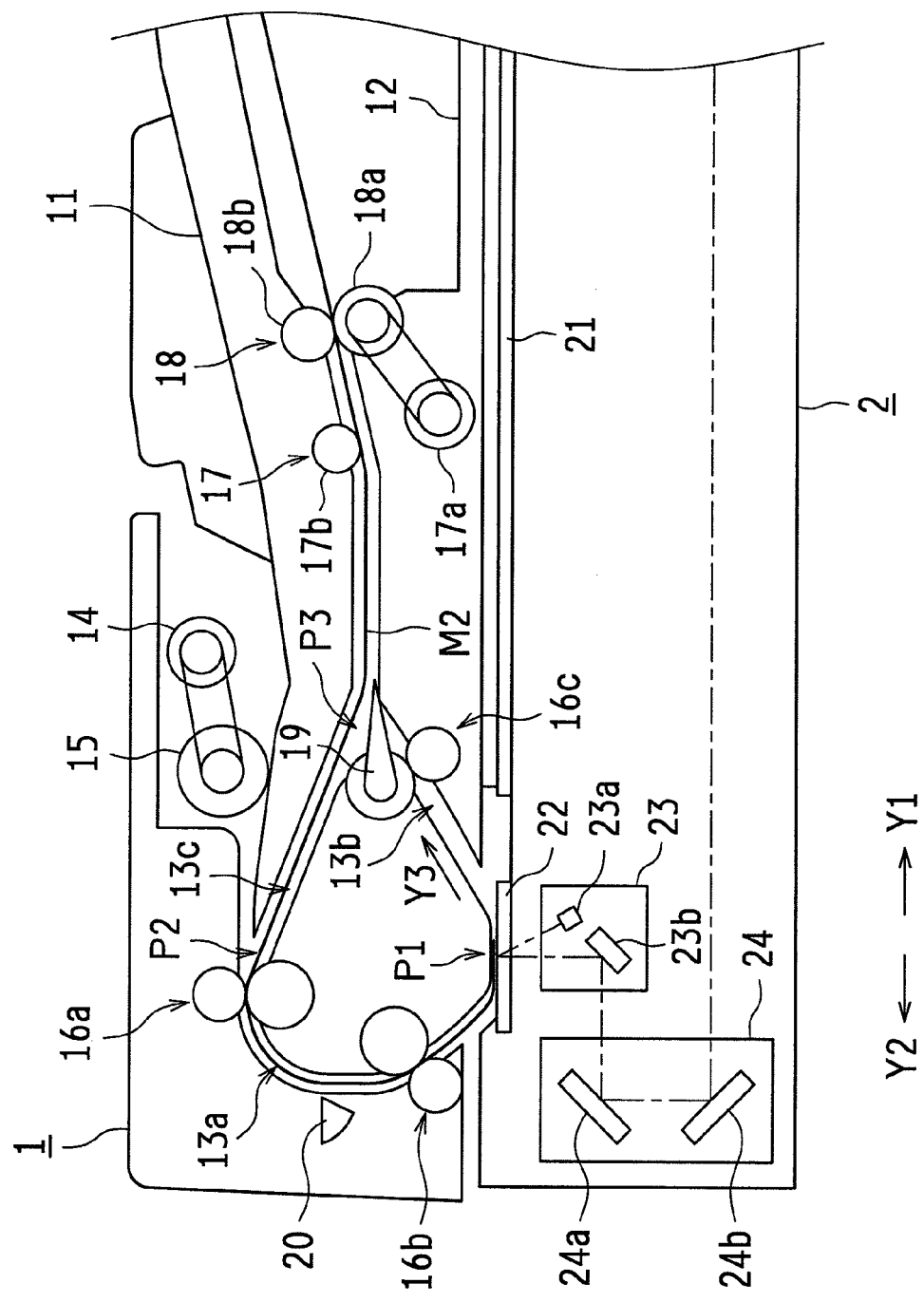
FIG. 25 is a view showing a state in which a leading edge of a document has been transported to the reading position of the document feeding device shown in FIG. 2.
Figure 26:
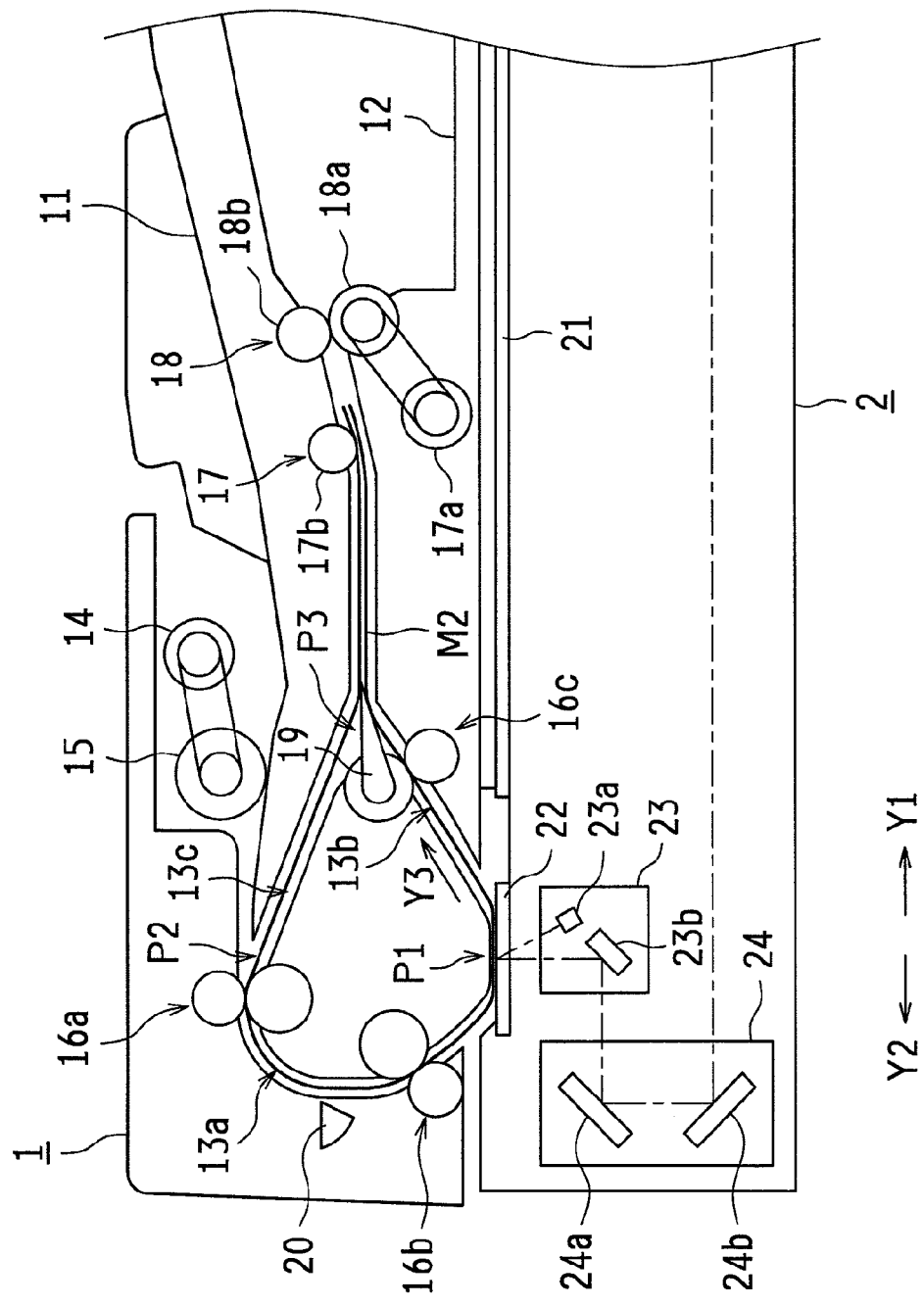
FIG. 26 is a view showing a state in which a leading edge and a trailing edge of a document are positioned between the rollers of the transport roller pair of the document feeding device shown in FIG. 2.
Figure 27:
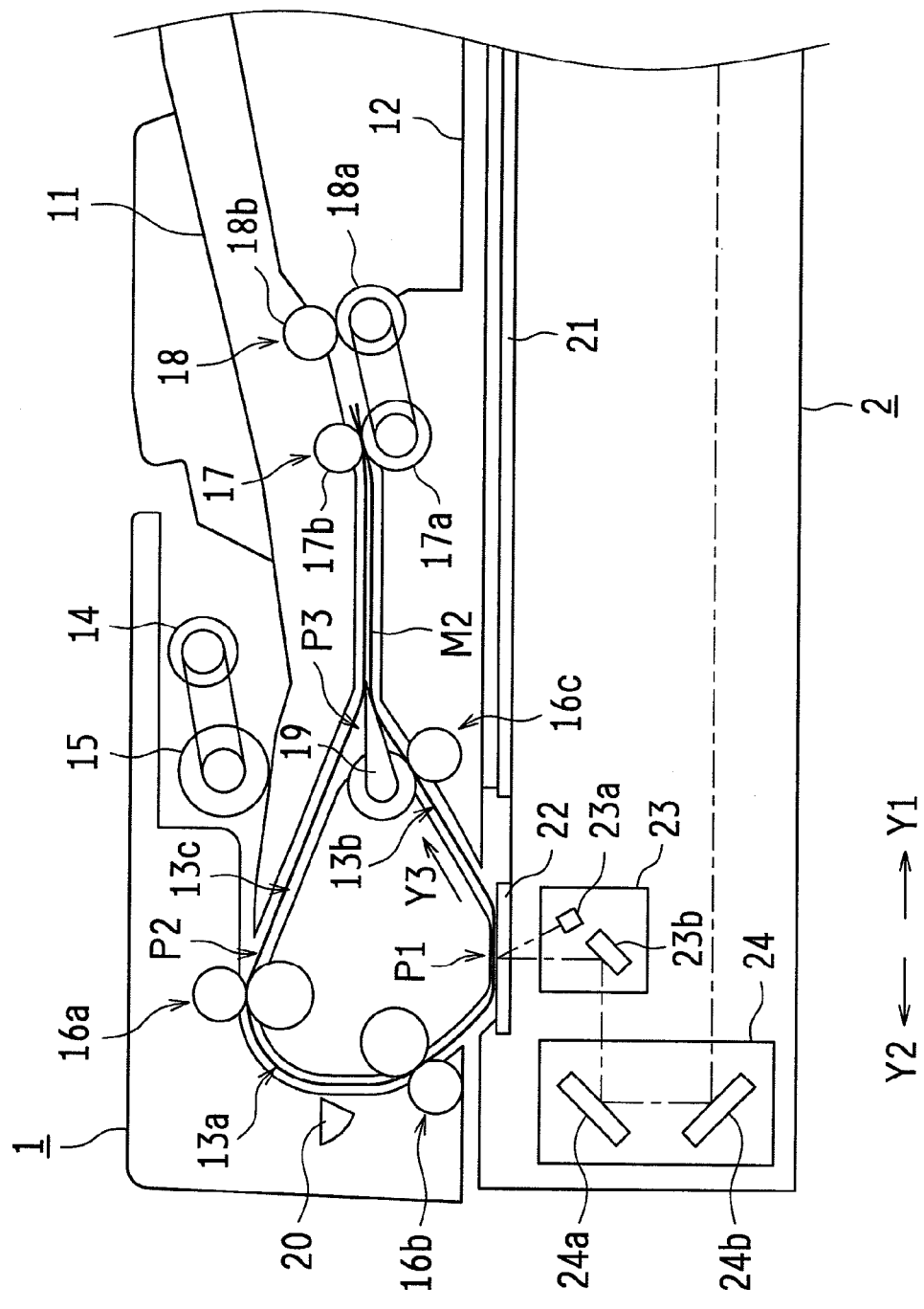
FIG. 27 is a view showing a state in which a leading edge and a trailing edge of a document are held by the transport roller pair of the document feeding device shown in FIG. 2.
Figure 28:
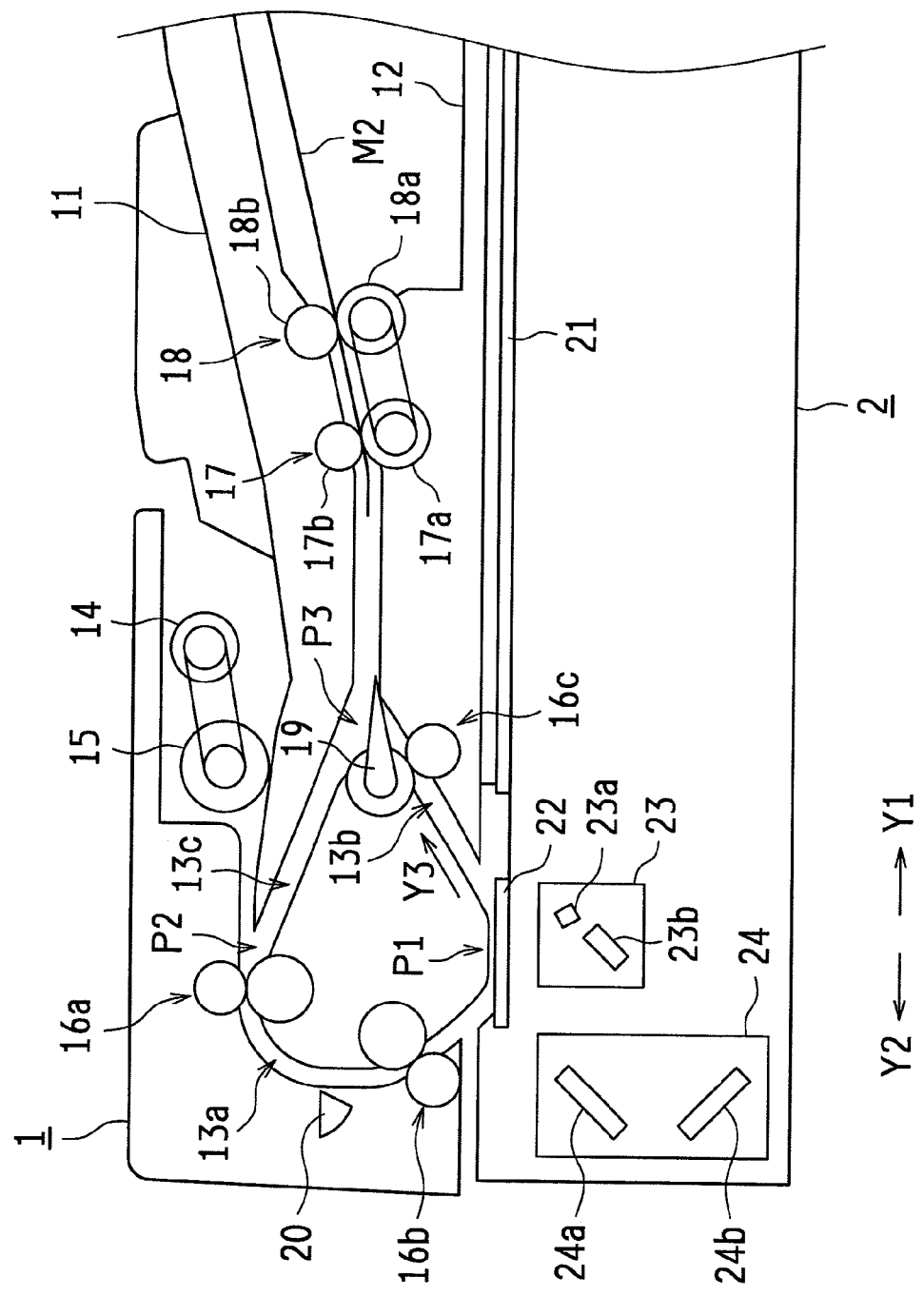
FIG. 28 is a view showing a state immediately before a document is discharged out of the document feeding device shown in FIG. 2.

FIGS. 13 to 15 are flowcharts for illustrating the operation of the image forming apparatus according to this embodiment at the time of double side reading. FIGS. 16 to 28 are front views for illustrating the operation of the image forming apparatus according to this embodiment at the time of double side reading. Hereinafter, the operation of the image forming apparatus 100 (see FIG. 1) according to this embodiment at the time of double side reading will be described with reference to FIGS. 13 to 28. The following description will be given of an exemplary operation that reads both faces of a document M2 (see FIG. 16) having the maximum length in the transport direction, among documents that can be transported by the document feeding device 1. The document M2 is, for example, of a legal size having a length in the transport direction of about 356 mm.

The pickup roller 14 (see FIG. 2) introduces the document M2 placed face up on the document tray 11 into the document feeding device 1. Then, the document M2 is passed to the separation roller 15 (see FIG. 2). (Step S21)

The separation roller 15 separates the documents M2 introduced into the document feeding device 1, and the documents M2 are fed sheet by sheet to the transport path 13a. Then, the documents M2 are each transported on the transport path 13a. (Step S22)

The control unit 33 (see FIG. 3) causes the motor 31 (see FIG. 3) to rotate forward. Accordingly, the transport roller pairs 16a to 16c rotate forward. Then, the transport roller pair 16a transports the document M2 on the transport path 13a. Here, at that time, the electromagnetic clutch 32 (see FIG. 3) is off, and the driving force of the motor 31 is not transmitted to the drive roller 18a of the discharge roller pair 18. Accordingly, the drive roller 17a of the transport roller pair 17 is positioned at the separation position. (Step S23)

The document M2 transported on the transport path 13a pushes the lever (not shown) out of the transport path 13a. Thus, the sensor 20 detects the movement of the lever. Accordingly, based on the detection results of the sensor 20, the control unit 33 determines that the document M2 (see FIG. 16) is positioned near the transport roller pair 16b on the upstream side of the transport roller pair 16b. (Step S24)

The control unit 33 determines whether or not the first period of time has elapsed after the sensor 20 detects the document M2. Then, if it is determined that the first period of time has elapsed, the procedure advances to Step S26. On the other hand, if it is determined that the first period of time has not elapsed, Step S25 is repeated. Here, the first period of time is a preset period of time from when the leading edge of the document M2 is detected by the sensor 20 to when the leading edge is transported to the reading position P1 (see FIG. 17). (Step S25)

The image reading unit 2 reads an image of the front face of the document M2 that passes through the reading position P1. Specifically, light is emitted from the light source 23a of the light source unit 23. At that time, the light emitted from the light source 23a illuminates the document M2 via the document reading glass 22. Then, light reflected by the document M2 travels via the document reading glass 22, the mirror 23b of the light source unit 23, and the mirror 24a and the mirror 24b of the mirror unit 24, and is incident on the imaging unit 25 (see FIG. 2). Here, reading of the front face of the document M2 is continued until the trailing edge of the document M2 has been transported through the reading position P1.

Then, the document M2 that has passed through the reading position P1 is transported to the transport path 13b. Subsequently, the document M2 transported in the transport direction Y3 on the transport path 13b pushes the claw member 19 up during the transport. At that time, the document M2 is transported by the transport roller pairs 16a to 16c. (Step S26)

The control unit 33 determines whether or not the second period of time has elapsed after the sensor 20 detects the document M2. Then, if it is determined that the second period of time has elapsed, the procedure advances to Step S28. On the other hand, if it is determined that the second period of time has not elapsed, Step S27 is repeated. Here, the second period of time is a period of time from when the leading edge of the document M2 is detected by the sensor 20 to when the leading edge is transported to a point between the rollers of the transport roller pair 17 (see FIG. 18). Furthermore, the second period of time is a preset period of time that is longer than the first period of time. Accordingly, if the second period of time has elapsed, the leading edge of the document M2 is positioned between the rollers of the transport roller pair 17. (Step S27)

The control unit 33 turns the electromagnetic clutch 32 on. Accordingly, the driving force of the motor 31 is transmitted to the drive roller 18a of the discharge roller pair 18. Accordingly, the drive roller 18a rotates forward, and the drive roller 17a of the transport roller pair 17 moves from the separation position to the contact position. Then, the drive roller 17a (see FIG. 19) rotates forward at the contact position. Accordingly, the transport roller pairs 16a to 16c, the transport roller pair 17, and the discharge roller pair 18 transport the document M2 in the transport direction. A detailed operation performed when the electromagnetic clutch 32 is turned on is as described above. (Step S28)

When the trailing edge of the document M2 that is being transported passes through a point near the transport roller pair 16b on the upstream side of the transport roller pair 16b, the lever (not shown) returns to the original position where it blocks the transport path 13a. Thus, the sensor 20 detects the movement of the lever. Accordingly, based on the detection results of the sensor 20, the control unit 33 determines that the document M2 (see FIG. 20) has passed through a point near the transport roller pair 16b on the upstream side of the transport roller pair 16b. (Step S29)

The control unit 33 determines whether or not the fourth period of time has elapsed after the sensor 20 detects the passage of the document M2. Then, if it is determined that the fourth period of time has elapsed, the procedure advances to Step S31. On the other hand, if it is determined that the fourth period of time has not elapsed, Step S30 is repeated. Here, the fourth period of time is a period of time from when the trailing edge of the document M2 passes by the sensor 20 to when the trailing edge is transported through the linking point P3. Furthermore, the fourth period of time is a preset period of time that is shorter than the third period of time. Accordingly, the document M2 (see FIG. 21) is transported in the transport direction Y3 until the trailing edge of the document M2 has been transported through (has passed through) the linking point P3. (Step S30)

The control unit 33 causes the motor 31 to rotate in reverse. Accordingly, the drive roller 18a of the discharge roller pair 18 rotates in reverse, and the drive roller 17a of the transport roller pair 17 (see FIG. 22) moves from the contact position to the separation position. Then, the transport direction of the document M2 is switched with the opposite direction, and the document M2 is transported in the transport direction Y2. That is to say, the document M2 temporarily travels from the circulation path to the switchback path, and then returns to the circulation path, and, thus, the leading edge and the trailing edge of the document M2 with respect to the transport direction are switched. At that time, since the claw member 19 is disposed at a position where it blocks the transport path 13b due to its own weight, the document M2 that is being transported in the transport direction Y2 is guided to the transport path 13c. Accordingly, the document M2 (see FIG. 23) that has been turned over is returned via the transport path 13c to the transport path 13a.

Here, when the motor 31 rotates in reverse, the transport roller pair 16a rotates forward. Furthermore, A detailed operation performed when the motor 31 rotates in reverse is as described above. (Step S31)

The document M2 transported on the transport path 13a pushes the lever (not shown) out of the transport path 13a. Thus, the sensor 20 detects the movement of the lever. Accordingly, based on the detection results of the sensor 20, the control unit 33 determines that the document M2 (see FIG. 24) is positioned near the transport roller pair 16b on the upstream side of the transport roller pair 16b. (Step S32)

The control unit 33 turns the electromagnetic clutch 32 off. Accordingly, the driving force of the motor 31 becomes not to be transmitted to the drive roller 18a of the discharge roller pair 18. Accordingly, the discharge roller pair 18 subsequently idly rotates due to a frictional force with the document M2. (Step S33)

The control unit 33 causes the motor 31 to rotate forward. Accordingly, the transport roller pairs 16a to 16c rotate forward. Here, at that time, the electromagnetic clutch 32 is off, and the driving force of the motor 31 is not transmitted to the drive roller 18a of the discharge roller pair 18. (Step S34)

The control unit 33 determines whether or not the first period of time has elapsed after the sensor 20 detects the document M2. Then, if it is determined that the first period of time has elapsed, the procedure advances to Step S36. On the other hand, if it is determined that the first period of time has not elapsed, Step S35 is repeated. Here, the first period of time is a period of time from when the leading edge of the document M2 is detected by the sensor 20 to when the leading edge is transported to the reading position P1 (see FIG. 25). (Step S35)

The image reading unit 2 reads an image of the back face of the document M2 that passes through the reading position P1. Here, reading of the back face of the document M2 is continued until the trailing edge of the document M2 has been transported through the reading position P1. Then, the document M2 that has passed through the reading position P1 is transported to the transport path 13b. Subsequently, the document M2 transported in the transport direction Y3 on the transport path 13b pushes the claw member 19 up during the transport. At that time, the document M2 is transported by the transport roller pairs 16a to 16c. (Step S36)

The control unit 33 determines whether or not the second period of time has elapsed after the sensor 20 detects the document M2. Then, if it is determined that the second period of time has elapsed, the procedure advances to Step S38. On the other hand, if it is determined that the second period of time has not elapsed, Step S37 is repeated. Here, the second period of time is a period of time from when the leading edge of the document M2 is detected by the sensor 20 to when the leading edge is transported to a point between the rollers of the transport roller pair 17 (see FIG. 26). Accordingly, if the second period of time has elapsed, the leading edge of the document M2 is positioned between the rollers of the transport roller pair 17. (Step S37)

The control unit 33 turns the electromagnetic clutch 32 on. Accordingly, the driving force of the motor 31 is transmitted to the drive roller 18a of the discharge roller pair 18. Accordingly, the drive roller 18a rotates forward, and the drive roller 17a of the transport roller pair 17 moves from the separation position to the contact position. Then, the drive roller 17a (see FIG. 27) rotates forward at the contact position. Accordingly, the drive roller 17a of the transport roller pair 17 transports the leading edge of the document M2 in the transport direction Y1. At that time, the transport roller pairs 16a to 16c transport the document M2, and, thus, the idler roller 17b idly rotates until the trailing edge of the document M2 has been transported through the transport roller pair 17. Here, a configuration is designed such that the trailing edge of the document M2 has been transported through the discharge roller pair 18 before the electromagnetic clutch 32 is turned on. A detailed operation performed when the electromagnetic clutch 32 is turned on is as described above. (Step S38)

When the trailing edge of the document M2 that is being transported passes through a point near the transport roller pair 16b on the upstream side of the transport roller pair 16b, the lever (not shown) returns to the original position where it blocks the transport path 13a. Thus, the sensor 20 detects the movement of the lever. Accordingly, based on the detection results of the sensor 20, the control unit 33 determines that the document M2 (see FIG. 20) has passed through a point near the transport roller pair 16b on the upstream side of the transport roller pair 16b. (Step S39)

The control unit 33 determines whether or not the fourth period of time has elapsed after the sensor 20 detects the passage of the document M2. Then, if it is determined that the fourth period of time has elapsed, the procedure advances to Step S41. On the other hand, if it is determined that the fourth period of time has not elapsed, Step S40 is repeated. Here, the fourth period of time is a period of time from when the trailing edge of the document M2 passes by the sensor 20 to when the trailing edge is transported through the linking point P3. Accordingly, the document M2 (see FIG. 21) is transported in the transport direction Y3 until the trailing edge of the document M2 has been transported through the linking point P3. (Step S40)

Steps S41 to S47 are respectively similar to Steps S31 to S34 and S37 to S39.

Steps S41 to S47 are steps for discharging the document M2 face down to the discharge tray 12, by feeding the document M2 whose both faces have been read again to the circulation path and turning the document M2 over. Accordingly, when the document M2 passes through the reading position P1, the image reading unit 2 does not read an image of the document.

The control unit 33 determines whether or not the third period of time has elapsed after the sensor 20 detects the passage of the document M2. Then, if it is determined that the third period of time has elapsed, the procedure advances to Step S49. On the other hand, if it is determined that the third period of time has not elapsed, Step S48 is repeated. Here, the third period of time is a preset period of time from when the trailing edge of the document M2 passes by the sensor 20 to when the trailing edge is transported through the discharge roller pair 18. Accordingly, the document M2 (see FIG. 28) is transported in the transport direction Y1 until the document M2 has been discharged by the discharge roller pair 18 face down to the discharge tray 12.

Accordingly, even in the case where a plurality of documents M2 are placed on the document tray 11 and the plurality of documents M2 are sequentially read and discharged to the discharge tray 12, the orientation of the faces can be prevented from being reversed with respect to the order of the plurality of documents M2. (Step S48)

The control unit 33 stops the driving of the motor 31. Thus, the operation at the time of double side reading ends. (Step S49)

In this embodiment, since the drive roller 17a of the transport roller pair 17 moves from the contact position to the separation position when the drive roller 18a of the discharge roller pair 18 rotates in reverse as described above, it is possible to withdraw the drive roller 17a from the transport path 13b when the discharge roller pair 18 transports the document M2 via the transport path 13c to the transport path 13a. Accordingly, the transport roller pair 17 can be prevented from disturbing the transport of the document M2 that is being switched back.

The embodiment disclosed in this application is to be construed in all respects as illustrative and not limiting. The technical scope of the present invention is indicated by the appended claims rather than only by the foregoing description. All variations falling within the meaning and range of equivalency of the claims are intended to be embraced therein.

For example, in this embodiment, an example was shown in which the document M2 whose both faces have been read is fed again to the circulation path, and, thus, the document M2 is discharged face down to the discharge tray 12. However, there is no limitation to this, and the document M2 whose both faces have been read may be discharged face up as it is to the discharge tray 12. That is to say, Steps S40 to S47 may be omitted.

Furthermore, in this embodiment, an example was shown in which the motor 31 for driving the transport roller pairs 16a to 16c also drives the discharge roller pair 18. However, there is no limitation to this, and a motor for driving the discharge roller pair 18 may be provided in addition to the motor for driving the transport roller pairs 16a to 16c.

Furthermore, in this embodiment, the pickup roller 14 and the separation roller 15 may be driven by the motor 31, or may be driven by a motor provided in addition to the motor 31.

Furthermore, in this embodiment, an example was shown in which, during a period from when a document is introduced by the pickup roller 14 to when the document is transported to a point between the rollers of the transport roller pair 17, the electromagnetic clutch 32 is off, and the drive roller 18a of the discharge roller pair 18 and the drive roller 17a of the transport roller pair 17 are not driven. However, there is no limitation to this, and during a period from when a document is introduced by the pickup roller 14 to when the document is transported to a point between the rollers of the transport roller pair 17, the electromagnetic clutch 32 may be on, and the drive roller 18a of the discharge roller pair 18 and the drive roller 17a of the transport roller pair 17 may rotate forward.

Furthermore, in this embodiment, the belt 46 was shown as an exemplary transmitting member that transmits the driving force of the drive roller 18a of the discharge roller pair 18 to the drive roller 17a of the transport roller pair 17. However, there is no limitation to this, and a chain, a gear, or the like may be provided as the transmitting member that transmits the driving force of the drive roller 18a of the discharge roller pair 18 to the drive roller 17a of the transport roller pair 17.

Furthermore, in this embodiment, the compression coil spring 45 that biases the drive roller 17a of the transport roller pair 17 in its axial direction (thrust direction) was shown as an exemplary load member. However, there is no limitation to this, and, for example, a plate spring that biases the drive roller 17a of the transport roller pair 17 in a direction (radial direction) orthogonal to the axial direction may be provided as the load member.

Furthermore, in this embodiment, an example was shown in which, if the second period of time has elapsed after a document is detected by the sensor 20, the document is determined to be positioned between the rollers of the transport roller pair 17. However, there is no limitation to this, and a sensor for detecting whether or not a document is positioned between the rollers of the transport roller pair 17 may be additionally provided.

Furthermore, in this embodiment, an example was shown in which, if the third period of time has elapsed after the passage of a document is detected by the sensor 20, the trailing edge of the document is determined to have been transported through the discharge roller pair 18. However, there is no limitation to this, and a sensor for detecting whether or not the trailing edge of the document has been transported through the discharge roller pair 18 may be additionally provided.

Furthermore, in this embodiment, an example was shown in which, if the fourth period of time has elapsed after the passage of a document is detected by the sensor 20, the trailing edge of the document is determined to have been transported through the linking point P3. However, there is no limitation to this, and a sensor for detecting whether or not the trailing edge of the document has been transported through the linking point P3 may be additionally provided.

Furthermore, in this embodiment, an example was shown in which the position of a document is determined based on the time that has elapsed after the document is detected by the sensor 20. However, there is no limitation to this, and the position of a document may be determined based on the number of rotations of the motor 31 after the document is detected by the sensor 20.

Furthermore, in this embodiment, an example was shown in which the shaft bearing portion 44c in the shape of a recess is formed on the side plate 44b of the holding member 44. However, there is no limitation to this, and a shaft bearing portion in the shape of a through hole may be formed on the side plate 44b of the holding member 44. In this case, it is sufficient that said end 172a of the drive roller 17a is in contact with the side plate 44b.

Furthermore, in this embodiment, an example was shown in which the document feeding device 1 is provided with the control unit 33. However, there is no limitation to this, and the document feeding device 1 may not be provided with the control unit 33, and the control unit 7 of the image forming apparatus 100 may play the role of the control unit 33.

Furthermore, in this embodiment, an example was shown in which the drive roller 17a moves between the contact position and the separation position. However, there is no limitation to this, and an idler roller may move between the contact position and the separation position. That is to say, although an example was shown in which the drive roller 17a is said roller of the present invention, and the idler roller 17b is the other roller of the present invention, there is no limitation to this, and the drive roller may be the other roller of the present invention, and the idler roller may be said roller of the present invention.

What is claimed is:

1. A document feeding device that includes:
    a first transport path on which a document is transported to a reading position;
    a second transport path on which the document that has been transported to the reading position is transported to a discharge tray;
    a third transport path that is disposed between the first transport path and the second transport path and on which the document that has passed through the reading position is returned to the first transport path; and
    a discharge roller pair that is disposed on the second transport path and that includes a first drive roller and a first idler roller, the discharge roller pair transporting the document that has passed through the reading position to the discharge tray by rotating the first drive roller forward, and transporting the document that has passed through the reading position via the third transport path to the first transport path by rotating the first drive roller in reverse;
    wherein the document feeding device comprises a transport roller pair that is disposed on the second transport path and that includes a second drive roller and a second idler roller,
    either one of the second drive roller and the second idler roller moves between a contact position where said roller is in contact with the other roller and a separation position where said roller is separated from the other roller, and
    the transport roller pair is disposed on the other side of the discharge roller pair from the discharge tray, and transports the document that has passed through the reading position to the discharge roller pair by positioning said roller at the contact position in a case where the first drive roller rotates forward.

2. The document feeding device according to claim 1, wherein the roller of the transport roller pair moves from the contact position to the separation position in a case where the first drive roller rotates in reverse.

3. The document feeding device according to claim 1,
    wherein said roller is the second drive roller, and
    the other roller is the second idler roller.

4. The document feeding device according to claim 3, further comprising a transmitting member that transmits a driving force of the first drive roller to the second drive roller.

5. The document feeding device according to claim 4, further comprising:
    a holding member that holds the second drive roller; and
    a load member that applies a load to rotation of the second drive roller;
    wherein the second drive roller held by the holding member moves between the contact position and the separation position in a case where the transmitting member transmits a driving force of the first drive roller to the second drive roller and the second drive roller does not rotate due to a load applied by the load member.

6. The document feeding device according to claim 5,
wherein the second drive roller is formed in a shape of a cylinder, and
the load member is disposed inside the second drive roller in the shape of a cylinder.

7. The document feeding device according to claim 6,
wherein the load member is a compression coil spring, and
the compression coil spring biases the second drive roller toward the holding member.

8. The document feeding device according to claim 4, wherein the transmitting member is a belt that is stretched between the first drive roller and the second drive roller.

9. The document feeding device according to claim 3,
wherein the first drive roller of the discharge roller pair rotates forward when a leading edge of a document transported on the second transport path reaches a position between the rollers of the transport roller pair, and
in a case where the first drive roller rotates forward, the second drive roller of the transport roller pair moves from the separation position to the contact position and then rotates forward.

10. The document feeding device according to claim 9,
wherein the forward-rotating first drive roller of the discharge roller pair rotates in reverse when a trailing edge of a document transported on the second transport path passes through a linking point between the second transport path and the third transport path, and
in a case where the first drive roller rotates in reverse, the second drive roller of the transport roller pair moves from the contact position to the separation position.

11. An image forming apparatus, comprising:
the document feeding device according to claim 1;
an image reading unit that reads a document transported by the document feeding device; and
an image forming unit that forms an image based on image data read by the image reading unit.

* * * * *